US012580680B2

(12) United States Patent
Yang et al.

(10) Patent No.: US 12,580,680 B2
(45) Date of Patent: Mar. 17, 2026

(54) INTERLEAVER DESIGN FOR NONCOHERENT REED MULLER CODES

(71) Applicant: QUALCOMM Incorporated, San Diego, CA (US)

(72) Inventors: Wei Yang, San Diego, CA (US); Jiun-Ting Huang, San Diego, CA (US); Jay Kumar Sundararajan, San Diego, CA (US); Runxin Wang, San Diego, CA (US); Hwan Joon Kwon, San Diego, CA (US); Krishna Kiran Mukkavilli, San Diego, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 493 days.

(21) Appl. No.: 17/405,449

(22) Filed: Aug. 18, 2021

(65) Prior Publication Data

US 2022/0103290 A1     Mar. 31, 2022

Related U.S. Application Data

(60) Provisional application No. 63/085,095, filed on Sep. 29, 2020.

(51) Int. Cl.
    *H04L 1/00*        (2006.01)
    *H04L 5/14*        (2006.01)
(52) U.S. Cl.
    CPC .......... *H04L 1/0061* (2013.01); *H04L 1/0071* (2013.01); *H04L 5/14* (2013.01)

(58) Field of Classification Search
    CPC .......... H04W 52/0229; H04W 52/0235; H04B 11/00; G06F 3/167; G06F 9/4418; Y02D 30/70; G10L 15/22; G10L 15/02; G10L 2015/223
    See application file for complete search history.

(56) References Cited

U.S. PATENT DOCUMENTS

| | | | | |
|---|---|---|---|---|
| 5,938,787 A | * | 8/1999 | Stark | H04L 1/0059 714/704 |
| 9,264,118 B1 | * | 2/2016 | Koike-Akino | H04L 25/0391 |
| 2004/0205383 A1 | * | 10/2004 | Sawaguchi | H03M 13/2957 |
| 2005/0002416 A1 | * | 1/2005 | Belotserkovsky | H04L 1/0041 714/701 |

(Continued)

OTHER PUBLICATIONS

Chen C., et al., "Noncoherent Detection with Polar Codes", I EEE Access, vol. 7, Jan. 16, 2019, pp. 6362-6372, XP011705596 (Jan. 16, 2019, DOI: 10.1109/ACCESS.2018.2889498 [retrieved on Jan. 15, 2019] the whole document.

(Continued)

*Primary Examiner* — Jay P Patel
*Assistant Examiner* — Shehab A Alawdi
(74) *Attorney, Agent, or Firm* — QUALCOMM Incorporated

(57)        ABSTRACT
A configuration for a device to interleave a codeword, where the codeword is based on an enhanced noncoherent error correction code. The apparatus encodes a set of bits based on a noncoherent error correction code to generate a first codeword. The apparatus interleaves the first codeword to permute coded bits of the first codeword into a second codeword. The apparatus transmits the second codeword to a second device.

26 Claims, 15 Drawing Sheets

(56)                References Cited

U.S. PATENT DOCUMENTS

| 2009/0016459 A1* | 1/2009 | Kim | H04W 28/18 |
| | | | 375/262 |
| 2012/0093014 A1* | 4/2012 | Hong | H04L 1/0071 |
| | | | 370/252 |
| 2012/0275532 A1* | 11/2012 | Wang | H04B 7/0671 |
| | | | 375/267 |
| 2013/0318421 A1* | 11/2013 | Seshadri | H03M 13/275 |
| | | | 714/776 |
| 2016/0373211 A1* | 12/2016 | Wang | H03M 13/23 |
| 2017/0149444 A1* | 5/2017 | Lin | H03M 13/116 |
| 2019/0042408 A1* | 2/2019 | Schmisseur | H05K 7/1489 |
| 2019/0081642 A1* | 3/2019 | Chen | H03M 13/1102 |

OTHER PUBLICATIONS

International Search Report and Written Opinion—PCT/US2021/046705—ISA/EPO—Nov. 25, 2021.

Vainappel J., et al., "Noncoherent Turbo Decoding", PROC., IEEE Global Telecommunications Conference, San Antonio, Texas, USA, Nov. 25-29, 2001, IEEE Operations Center, Piscataway, NJ, Nov. 25, 2001 (Nov. 25, 2001), pp. 952-956, XP001099246, DOI: 10.1109/GLOCOM.2001.965559 ISBN: 978-0-7803-7206-1 the whole document.

Xu H., et al., "Short Polar-Coded Non-Coherent Receiver", PROC., IEEE 3rd Information Technology Networking Electronic and Automation Control Conference (ITNEC), IEEE, Mar. 15, 2019 (Mar. 15, 2019), pp. 205-209, XP033557823, D0I:10.1109/ITNEC.2019.8729533 [retrieved on Jun. 3, 2019] the whole document.

Zheng M., et al., "Polar Coding for Noncoherent Block Fading Channels", PROC., IEEE 10th International Conference on Wireless Communications and Signal Processing (WCSP), IEEE, Oct. 18, 2018 (Oct. 18, 2018), 5 Pages, XP033460213, DOI:10.1109/WCSP.2018.8555698 [retrieved on Nov. 30, 2018] the whole document.

* cited by examiner

400

Coherent communication system

410

Noncoherent communication system

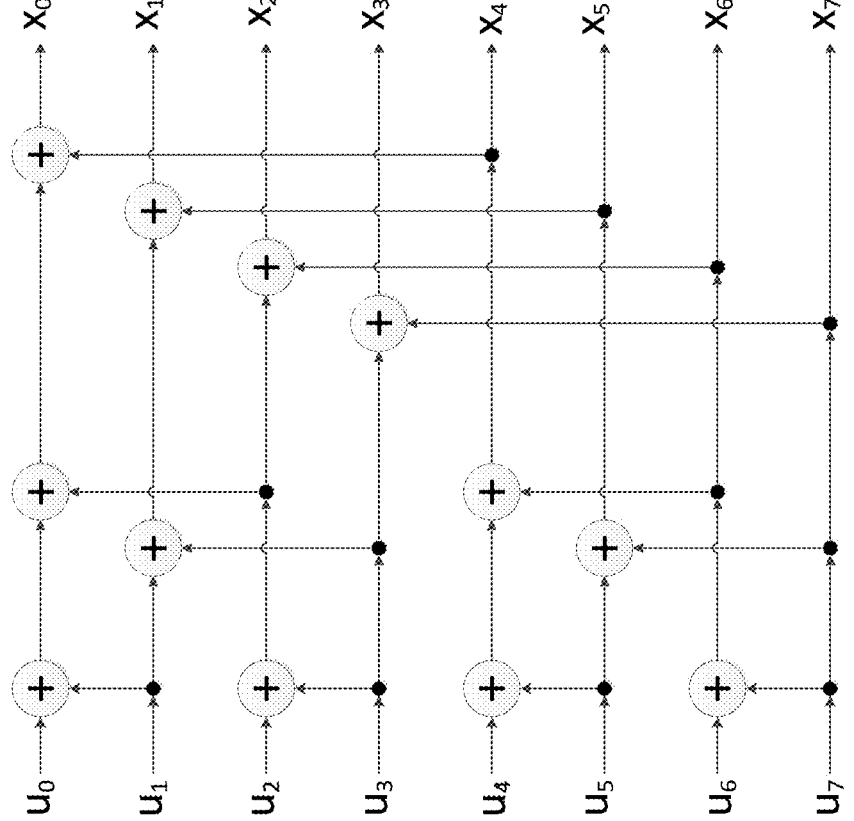
FIG. 6

800

810

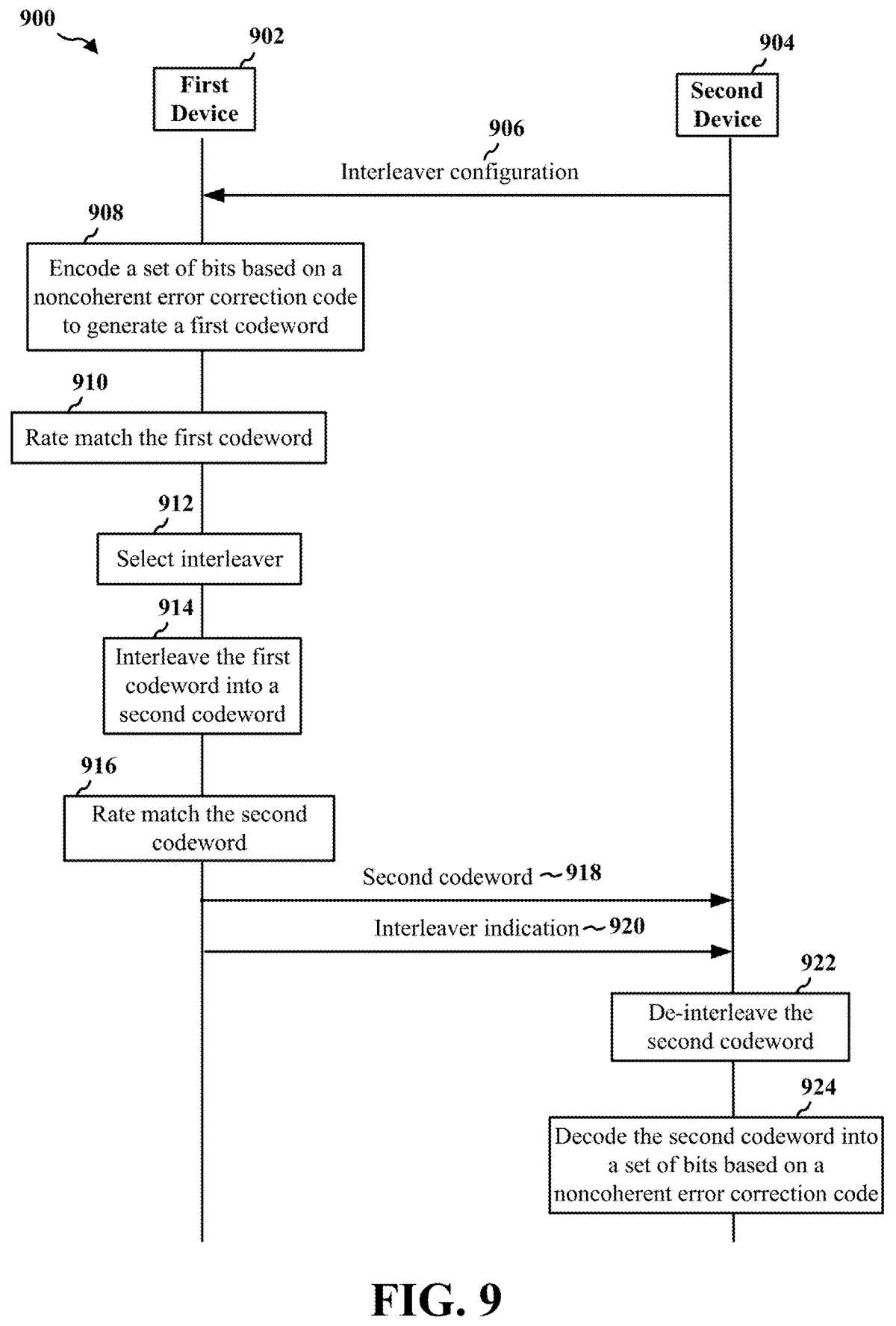

900

902

First Device

904

Second Device

906

Interleaver configuration

908

Encode a set of bits based on a noncoherent error correction code to generate a first codeword

910

Rate match the first codeword

912

Select interleaver

914

Interleave the first codeword into a second codeword

916

Rate match the second codeword

Second codeword ～918

Interleaver indication ～920

922

De-interleave the second codeword

924

Decode the second codeword into a set of bits based on a noncoherent error correction code

FIG. 9

1002 encode a set of bits based on a noncoherent error correction code to generate the first codeword

1004 interleave the first codeword to permute the coded bits of the first codeword into a second codeword

1006 transmit the second codeword to a second device

1000

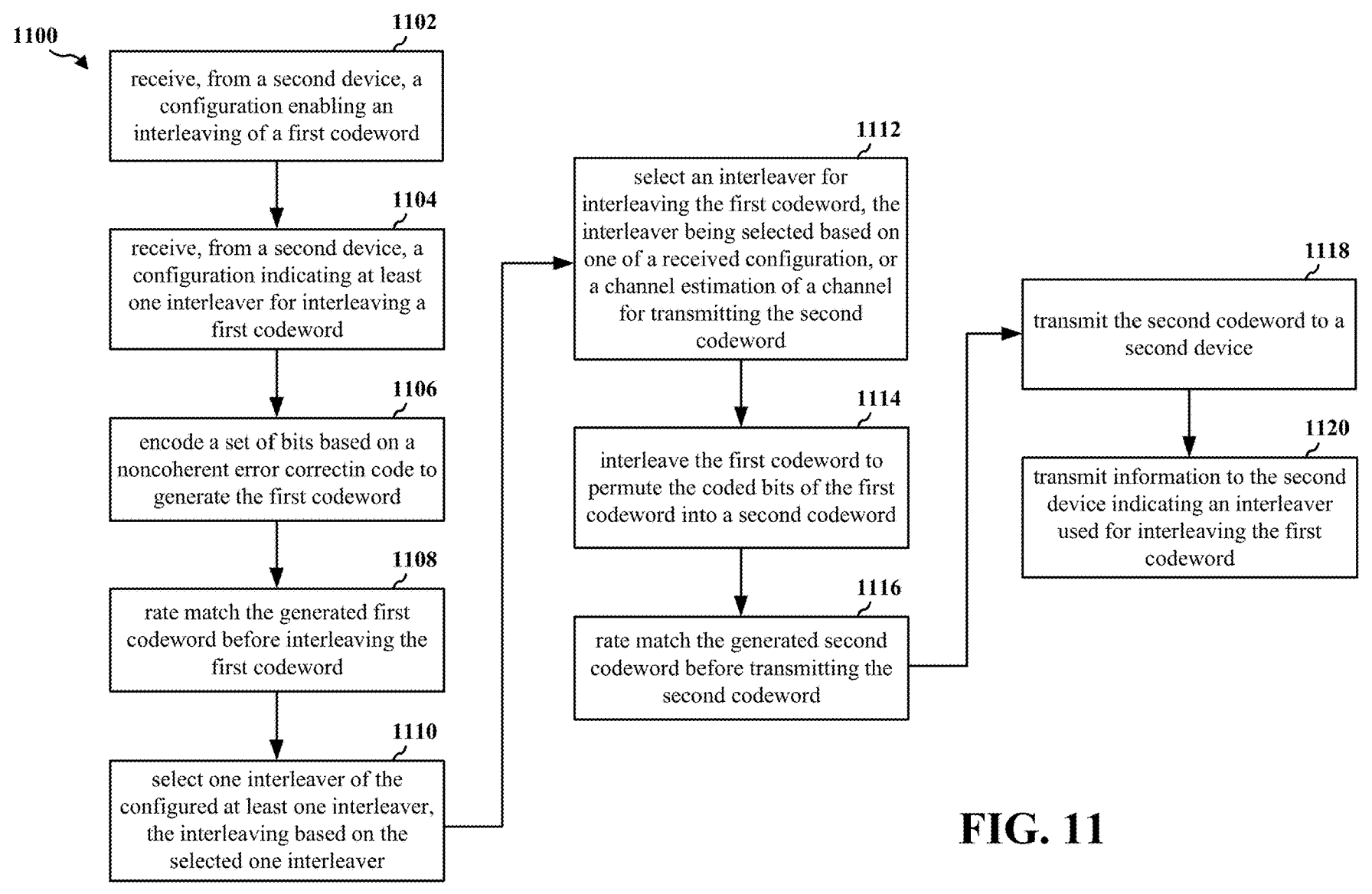

1100

1102 receive, from a second device, a configuration enabling an interleaving of a first codeword

1104 receive, from a second device, a configuration indicating at least one interleaver for interleaving a first codeword

1106 encode a set of bits based on a noncoherent error correctin code to generate the first codeword

1108 rate match the generated first codeword before interleaving the first codeword

1110 select one interleaver of the configured at least one interleaver, the interleaving based on the selected one interleaver

1112 select an interleaver for interleaving the first codeword, the interleaver being selected based on one of a received configuration, or a channel estimation of a channel for transmitting the second codeword

1114 interleave the first codeword to permute the coded bits of the first codeword into a second codeword

1116 rate match the generated second codeword before transmitting the second codeword

1118 transmit the second codeword to a second device

1120 transmit information to the second device indicating an interleaver used for interleaving the first codeword

FIG. 11

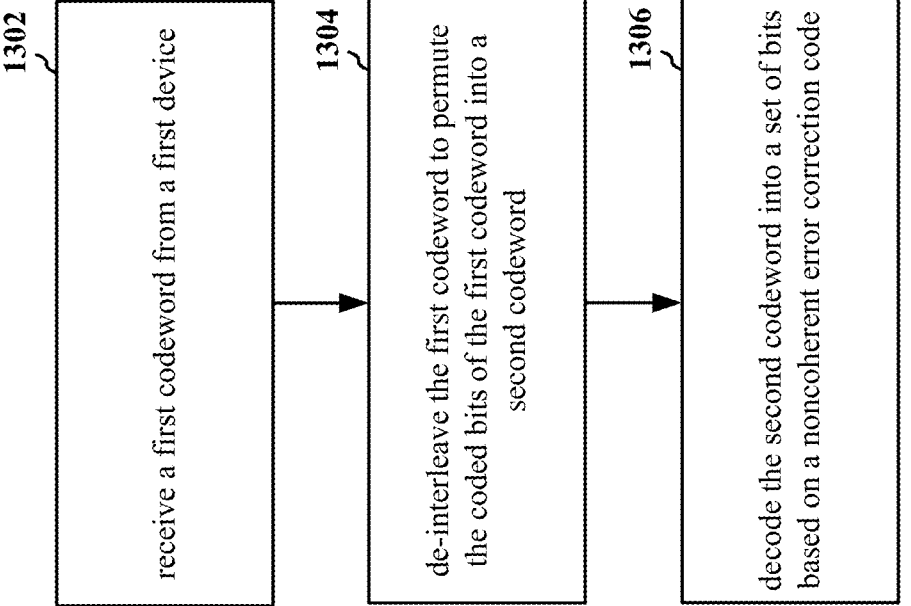
1302
receive a first codeword from a first device
1304
de-interleave the first codeword to permute the coded bits of the first codeword into a second codeword
1306
decode the second codeword into a set of bits based on a noncoherent error correction code
1300
FIG. 13

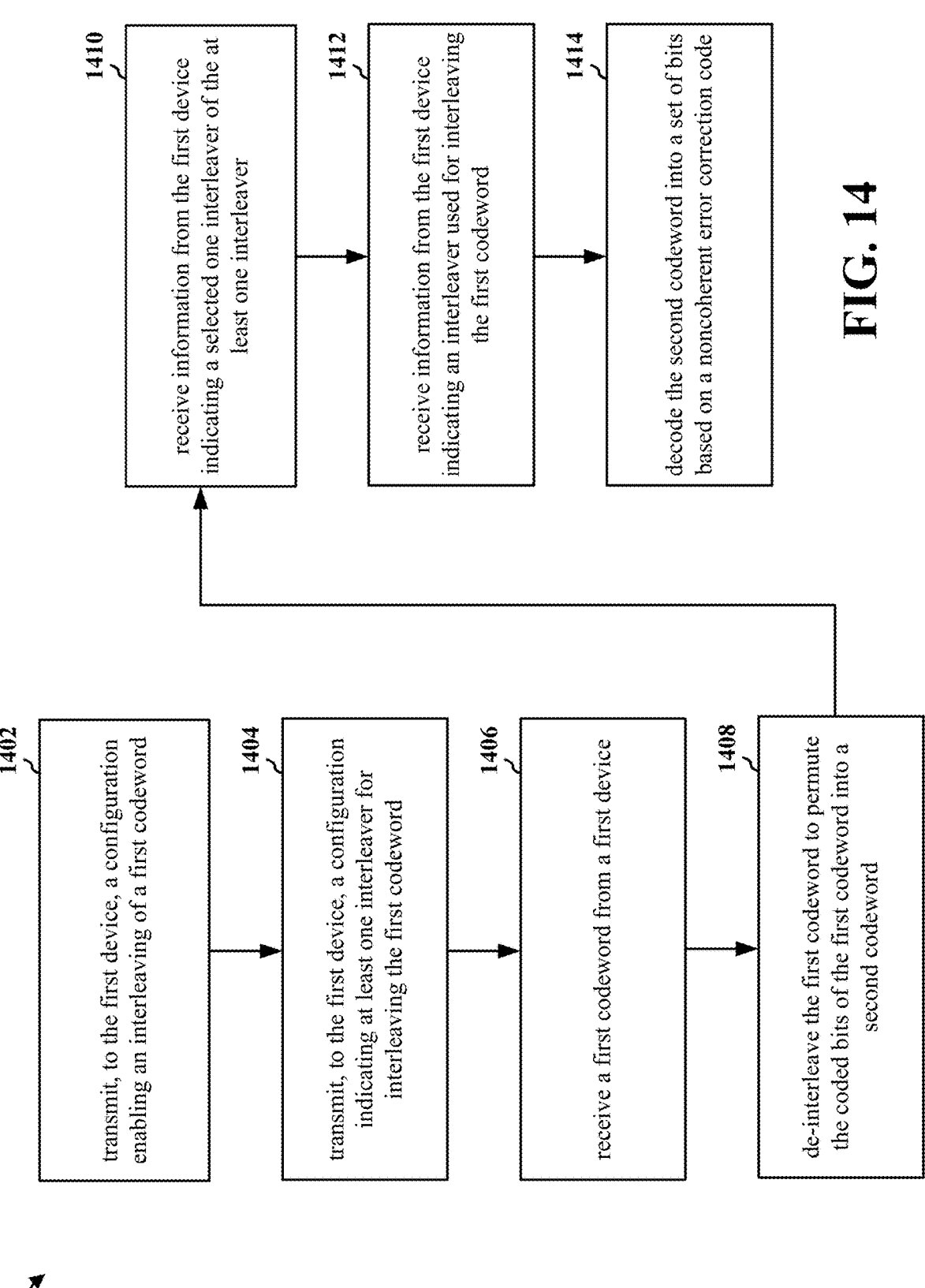

1402　transmit, to the first device, a configuration enabling an interleaving of a first codeword 1404　transmit, to the first device, a configuration indicating at least one interleaver for interleaving the first codeword 1406　receive a first codeword from a first device 1408　de-interleave the first codeword to permute the coded bits of the first codeword into a second codeword 1410　receive information from the first device indicating a selected one interleaver of the at least one interleaver 1412　receive information from the first device indicating an interleaver used for interleaving the first codeword 1414　decode the second codeword into a set of bits based on a noncoherent error correction code

INTERLEAVER DESIGN FOR NONCOHERENT REED MULLER CODES

CROSS REFERENCE TO RELATED APPLICATION(S)

This application claims the benefit of and priority to U.S. Provisional Application Ser. No. 63/085,095, entitled "Interleaver Design for Noncoherent Reed Muller Codes" and filed on Sep. 29, 2020, which is expressly incorporated by reference herein in its entirety.

TECHNICAL FIELD

The present disclosure relates generally to communication systems, and more particularly, to a configuration for an interleaver design for noncoherent Reed-Muller (RM) codes.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (e.g., with Internet of Things (IoT)), and other requirements. 5G NR includes services associated with enhanced mobile broadband (eMBB), massive machine type communications (mMTC), and ultra-reliable low latency communications (URLLC). Some aspects of 5G NR may be based on the 4G Long Term Evolution (LTE) standard. There exists a need for further improvements in 5G NR technology. These improvements may also be applicable to other multi-access technologies and the telecommunication standards that employ these technologies.

BRIEF SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

Noncoherent channel coding may utilize modified error correction codes (e.g., RM codes) over noncoherent fading channels. Conventional RM codes may be parameterized by a pair of integers r and m, which may be known as the $RM(r,m)$ code, where r may refer to the order of the RM code (e.g., r-th order RM code), and m is an integer $\geq 0$. However, conventional RM codes may not work over noncoherent fading channels due to phase ambiguity. In addition, some of the decoding algorithms for the noncoherent RM codes may be sensitive to the phase changes of the fading channel coefficients. For example, when the codes are transmitted with frequency hopping, the fading realizations on the different frequency hops of the same transmission may be very different. This may result in the problem, because some information bits of the RM code may be embedded on coded bits that are far away from each other, such that a receiver is unable to properly decode the coded bits that are far away from each other. Aspects provided herein provide a configuration for an interleaver design for noncoherent error correction codes (e.g., RM codes). The interleaver may be configured to permute the coded bits into a same frequency hop or to close locations, in an effort to allow the receiver to decode the coded bits.

In an aspect of the disclosure, a method, a computer-readable medium, and an apparatus are provided. The apparatus may be a device at a UE. The device may be a processor and/or a modem at a UE or the UE itself. The apparatus may be a device at a base station. The device may be a processor and/or a modem at a base station or the base station itself. The apparatus encodes a set of bits based on a noncoherent error correction code to generate a first codeword. The apparatus interleaves the first codeword to permute the coded bits of the first codeword into a second codeword. The apparatus transmits the second codeword to a second device.

In an aspect of the disclosure, a method, a computer-readable medium, and an apparatus are provided. The apparatus may be a device at a UE. The device may be a processor and/or a modem at a UE or the UE itself. The apparatus may be a device at a base station. The device may be a processor and/or a modem at a base station or the base station itself. The apparatus receives a first codeword from a first device. The apparatus de-interleaves the first codeword to permute coded bits of the first codeword into a second codeword. The apparatus decodes the second codeword into a set of bits based on a noncoherent error correction code.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

FIG. 6 illustrates an example of an encoder.

FIG. 9 is a call flow diagram of an exemplary signaling between a first wireless device and a second wireless device.

FIG. 11 is a flowchart of a method of wireless communication.

FIG. 13 is a flowchart of a method of wireless communication.

FIG. 14 is a flowchart of a method of wireless communication.

DETAILED DESCRIPTION

Figure 1:
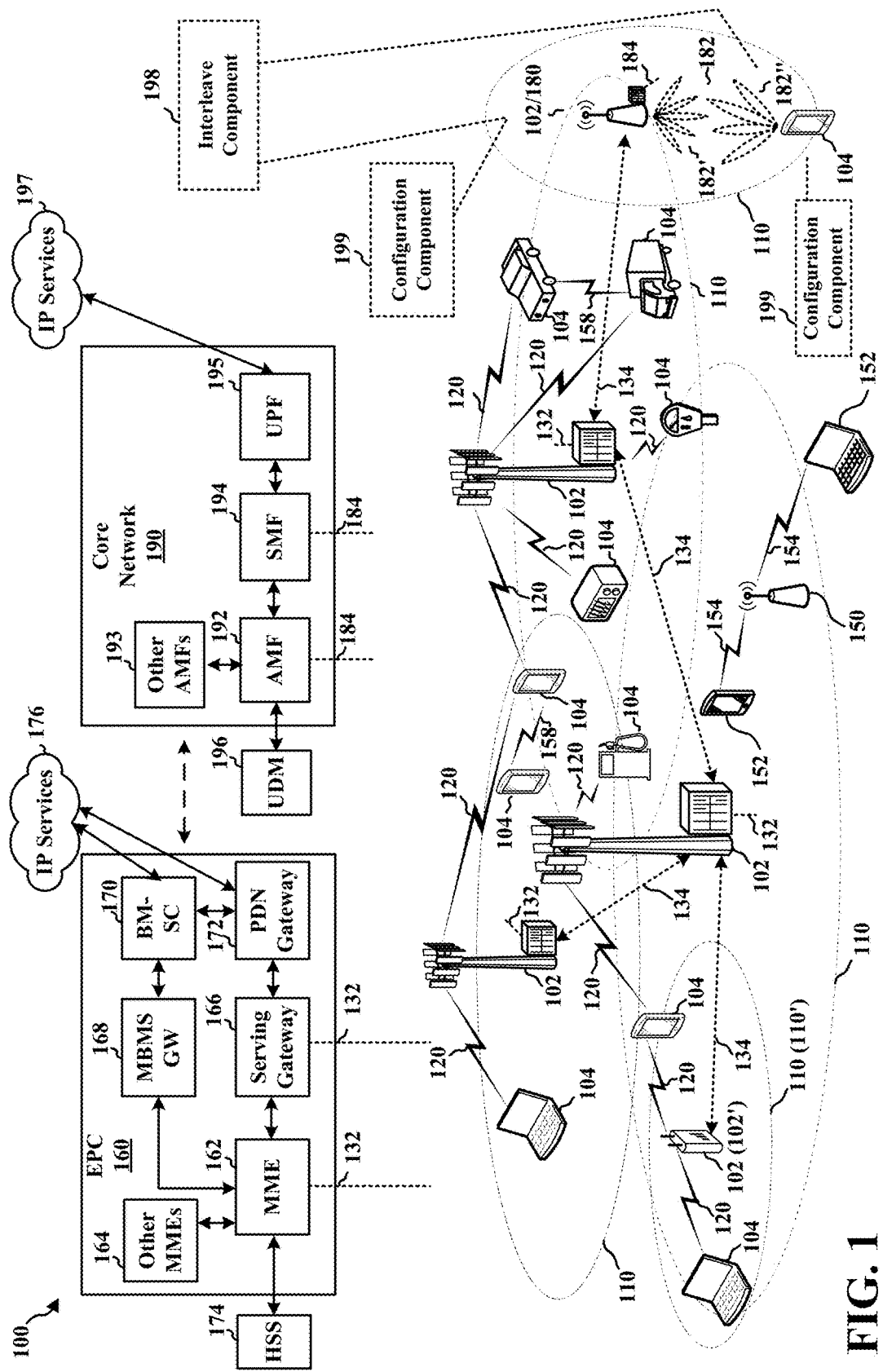
FIG. 1 is a diagram illustrating an example of a wireless communications system and an access network.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), optical disk storage, magnetic disk storage, other magnetic storage devices, combinations of the types of computer-readable media, or any other medium that can be used to store computer executable code in the form of instructions or data structures that can be accessed by a computer.

While aspects and implementations are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, implementations and/or uses may come about via integrated chip implementations and other non-module-component based devices (e.g., end-user devices, vehicles, communication devices, computing devices, industrial equipment, retail/purchasing devices, medical devices, artificial intelligence (AI)-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also include additional components and features for implementation and practice of claimed and described aspect. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, aggregated or disaggregated components, end-user devices, etc. of varying sizes, shapes, and constitution.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (e.g., a 5G Core (5GC)). The base stations 102 may include macrocells (high power cellular base station) and/or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (e.g., S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (e.g., through the EPC 160 or core network 190) with each other over third backhaul links 134 (e.g., X2 interface). The first backhaul links 132, the second backhaul links 184, and the third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell 102' may have a coverage area 110' that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 and/or downlink (DL) (also referred to as forward link) transmissions from a base station 102 to a UE 104. The communication links 120 may use multiple-input and multiple-output (MIMO) antenna technology, including spatial multiplexing, beamforming, and/or transmit diversity. The communication links may be through one or more carriers. The base stations 102/UEs 104 may use spectrum up to Y MHz (e.g., 5, 10, 15, 20, 100, 400, etc. MHz) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (e.g., more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Certain UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, WiMedia, Bluetooth, ZigBee, Wi-Fi based on the Institute of Electrical and Electronics Engineers (IEEE) 802.11 standard, LTE, or NR.

The wireless communications system may further include a Wi-Fi access point (AP) 150 in communication with Wi-Fi stations (STAs) 152 via communication links 154, e.g., in a 5 GHz unlicensed frequency spectrum or the like. When communicating in an unlicensed frequency spectrum, the STAs 152/AP 150 may perform a clear channel assessment (CCA) prior to communicating in order to determine whether the channel is available.

The small cell 102' may operate in a licensed and/or an unlicensed frequency spectrum. When operating in an unlicensed frequency spectrum, the small cell 102' may employ NR and use the same unlicensed frequency spectrum (e.g., 5 GHz, or the like) as used by the Wi-Fi AP 150. The small cell 102', employing NR in an unlicensed frequency spectrum, may boost coverage to and/or increase capacity of the access network.

The electromagnetic spectrum is often subdivided, based on frequency/wavelength, into various classes, bands, channels, etc. In 5GNR, two initial operating bands have been identified as frequency range designations FR1 (410 MHz-7.125 GHz) and FR2 (24.25 GHz-52.6 GHz). Although a portion of FR1 is greater than 6 GHz, FR1 is often referred to (interchangeably) as a "sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

A base station 102, whether a small cell 102' or a large cell (e.g., macro base station), may include and/or be referred to as an eNB, gNodeB (gNB), or another type of base station. Some base stations, such as gNB 180 may operate in a traditional sub 6 GHz spectrum, in millimeter wave frequencies, and/or near millimeter wave frequencies in communication with the UE 104. When the gNB 180 operates in millimeter wave or near millimeter wave frequencies, the gNB 180 may be referred to as a millimeter wave base station. The millimeter wave base station 180 may utilize beamforming 182 with the UE 104 to compensate for the path loss and short range. The base station 180 and the UE 104 may each include a plurality of antennas, such as antenna elements, antenna panels, and/or antenna arrays to facilitate the beamforming.

The base station 180 may transmit a beamformed signal to the UE 104 in one or more transmit directions 182′. The UE 104 may receive the beamformed signal from the base station 180 in one or more receive directions 182″. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, and/or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include an Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a Packet Switch (PS) Streaming (PSS) Service, and/or other IP services.

The base station may include and/or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (e.g., parking meter, gas pump, toaster, vehicles, heart monitor, etc.). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. In some scenarios, the term UE may also apply to one or more companion devices such as in a device constellation arrangement. One or more of these devices may collectively access the network and/or individually access the network.

Referring again to FIG. 1, in certain aspects, the first device (e.g., UE 104 or base station 180) may be configured to interleave a codeword, where the codeword is based on an enhanced noncoherent error correction code. For example, the first device (e.g., UE 104 or base station 180) may comprise an interleave component 198 configured to the first codeword to permute coded bits of the first codeword into a second codeword. The first device may encode a set of bits based on a noncoherent error correction code to generate a first codeword. The first device may interleave the first codeword to permute the coded bits of the first codeword into a second codeword. The first device may transmit the second codeword to a second device.

Referring again to FIG. 1, in certain aspects, the second device (e.g., base station 180 or UE 104) may be configured to configure a first device to interleave a codeword, where the codeword is based on an enhanced noncoherent error correction code. For example, the second device (e.g., base station 180 or UE 104) may comprise a configuration component 199 configured to transmit a configuration enabling an interleaving of the first codeword. The second device may receive a first codeword from a first device. The second device may de-interleave the first codeword to permute coded bits of the first codeword into a second codeword. The second device may decode the second codeword into a set of bits based on a noncoherent error correction code.

Although the following description may be focused on 5G NR, the concepts described herein may be applicable to other similar areas, such as LTE, LTE-A, CDMA, GSM, and other wireless technologies.

Figures 2A, 2B, 2C, 2D:
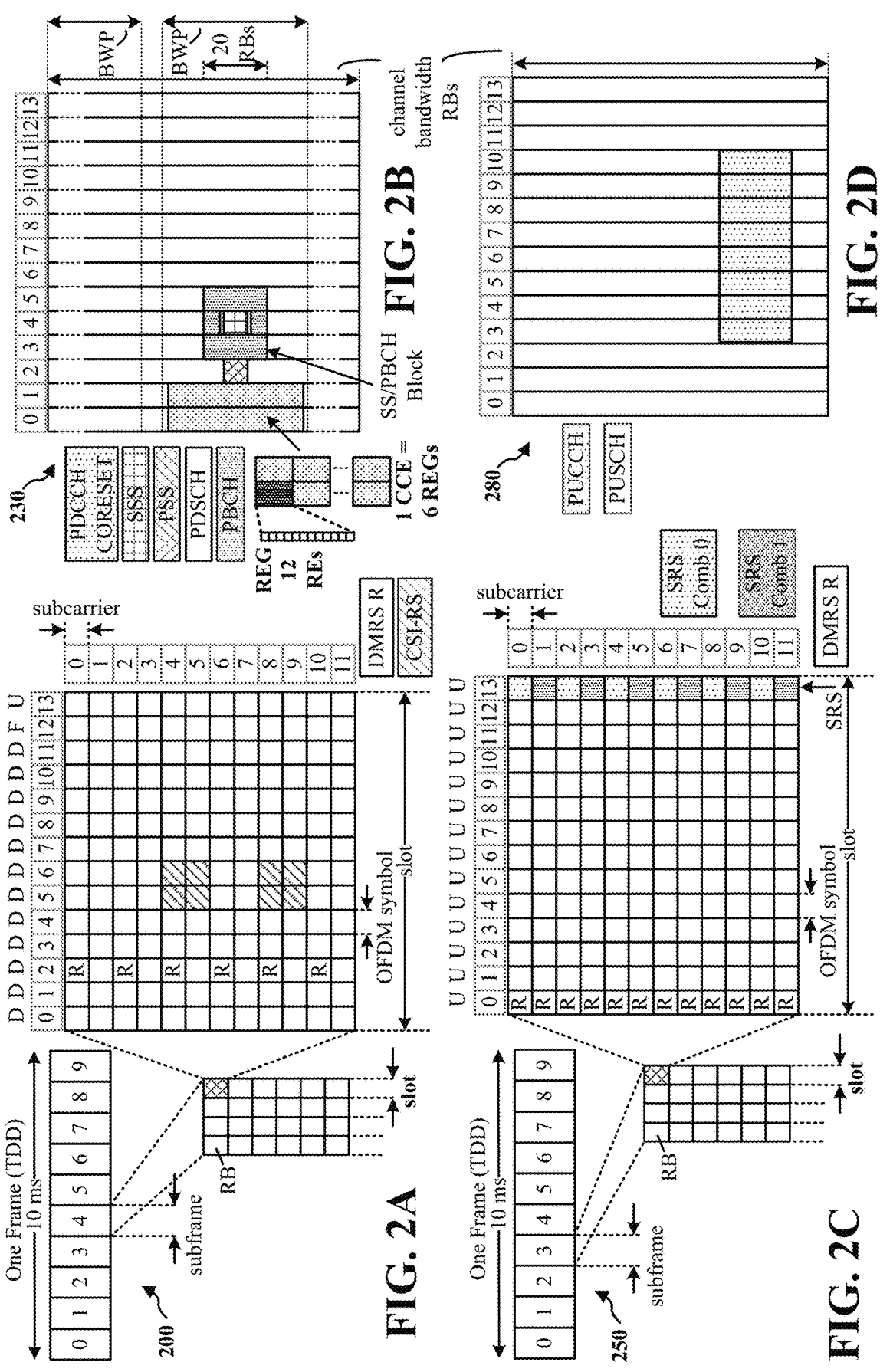
FIG. 2A is a diagram illustrating an example of a first frame, in accordance with various aspects of the present disclosure.
FIG. 2B is a diagram illustrating an example of DL channels within a subframe, in accordance with various aspects of the present disclosure.
FIG. 2C is a diagram illustrating an example of a second frame, in accordance with various aspects of the present disclosure.
FIG. 2D is a diagram illustrating an example of UL channels within a subframe, in accordance with various aspects of the present disclosure.

FIG. 2A is a diagram 200 illustrating an example of a first subframe within a 5G NR frame structure. FIG. 2B is a diagram 230 illustrating an example of DL channels within a 5G NR subframe. FIG. 2C is a diagram 250 illustrating an example of a second subframe within a 5G NR frame structure. FIG. 2D is a diagram 280 illustrating an example of UL channels within a 5G NR subframe. The 5G NR frame structure may be frequency division duplexed (FDD) in which for a particular set of subcarriers (carrier system bandwidth), subframes within the set of subcarriers are dedicated for either DL or UL, or may be time division duplexed (TDD) in which for a particular set of subcarriers (carrier system bandwidth), subframes within the set of subcarriers are dedicated for both DL and UL. In the examples provided by FIGS. 2A, 2C, the 5G NR frame structure is assumed to be TDD, with subframe 4 being configured with slot format 28 (with mostly DL), where D is DL, U is UL, and F is flexible for use between DL/UL, and subframe 3 being configured with slot format 1 (with all UL). While subframes 3, 4 are shown with slot formats 1, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description infra applies also to a 5G NR frame structure that is TDD.

FIGS. 2A-2D illustrate a frame structure, and the aspects of the present disclosure may be applicable to other wireless communication technologies, which may have a different frame structure and/or different channels. A frame (10 ms) may be divided into 10 equally sized subframes (1 ms). Each subframe may include one or more time slots. Subframes may also include mini-slots, which may include 7, 4, or 2 symbols. Each slot may include 14 or 12 symbols, depending on whether the cyclic prefix (CP) is normal or extended. For normal CP, each slot may include 14 symbols, and for extended CP, each slot may include 12 symbols. The symbols on DL may be CP orthogonal frequency division multiplexing (OFDM) (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the CP and the numerology. The numerology defines the subcarrier spacing (SCS) and, effectively, the symbol length/duration, which is equal to 1/SCS.

| μ | SCS<br>$\Delta f = 2^\mu \cdot 15[kHz]$ | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

For normal CP (14 symbols/slot), different numerologies μ 0 to 4 allow for 1, 2, 4, 8, and 16 slots, respectively, per subframe. For extended CP, the numerology 2 allows for 4 slots per subframe. Accordingly, for normal CP and numerology μ, there are 14 symbols/slot and $2^\mu$ slots/subframe. The subcarrier spacing may be equal to $2^\mu * 15$ kHz, where μ is the numerology 0 to 4. As such, the numerology μ=0 has a subcarrier spacing of 15 kHz and the numerology μ=4 has a subcarrier spacing of 240 kHz. The symbol length/duration is inversely related to the subcarrier spacing. FIGS. 2A-2D provide an example of normal CP with 14 symbols per slot and numerology μ=2 with 4 slots per subframe. The slot duration is 0.25 ms, the subcarrier spacing is 60 kHz, and the symbol duration is approximately 16.67 μs. Within a set of frames, there may be one or more different bandwidth parts (BWPs) (see FIG. 2B) that are frequency division multiplexed. Each BWP may have a particular numerology and CP (normal or extended).

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as R for one particular configuration, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs) (e.g., 1, 2, 4, 8, or 16 CCEs), each CCE including six RE groups (REGs), each REG including 12 consecutive REs in an OFDM symbol of an RB. A PDCCH within one BWP may be referred to as a control resource set (CORESET). A UE is configured to monitor PDCCH candidates in a PDCCH search space (e.g., common search space, UE-specific search space) during PDCCH monitoring occasions on the CORESET, where the PDCCH candidates have different DCI formats and different aggregation levels. Additional BWPs may be located at greater and/or lower frequencies across the channel bandwidth. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the DM-RS. The physical broadcast channel (PBCH), which carries a master information block (MIB), may be logically grouped with the PSS and SSS to form a synchronization signal (SS)/PBCH block (also referred to as SS block (SSB)). The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. The UE may transmit sounding reference signals (SRS). The SRS may be transmitted in the last symbol of a subframe. The SRS may have a comb structure, and a UE may transmit SRS on one of the combs. The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and hybrid automatic repeat request (HARQ) acknowledgment (ACK) (HARQ-ACK) feedback (i.e., one or more HARQ ACK bits indicating one or more ACK and/or negative ACK (NACK)). The PUSCH carries data, and may additionally be used to carry a buffer status report (BSR), a power headroom report (PHR), and/or UCI.

Figure 3:
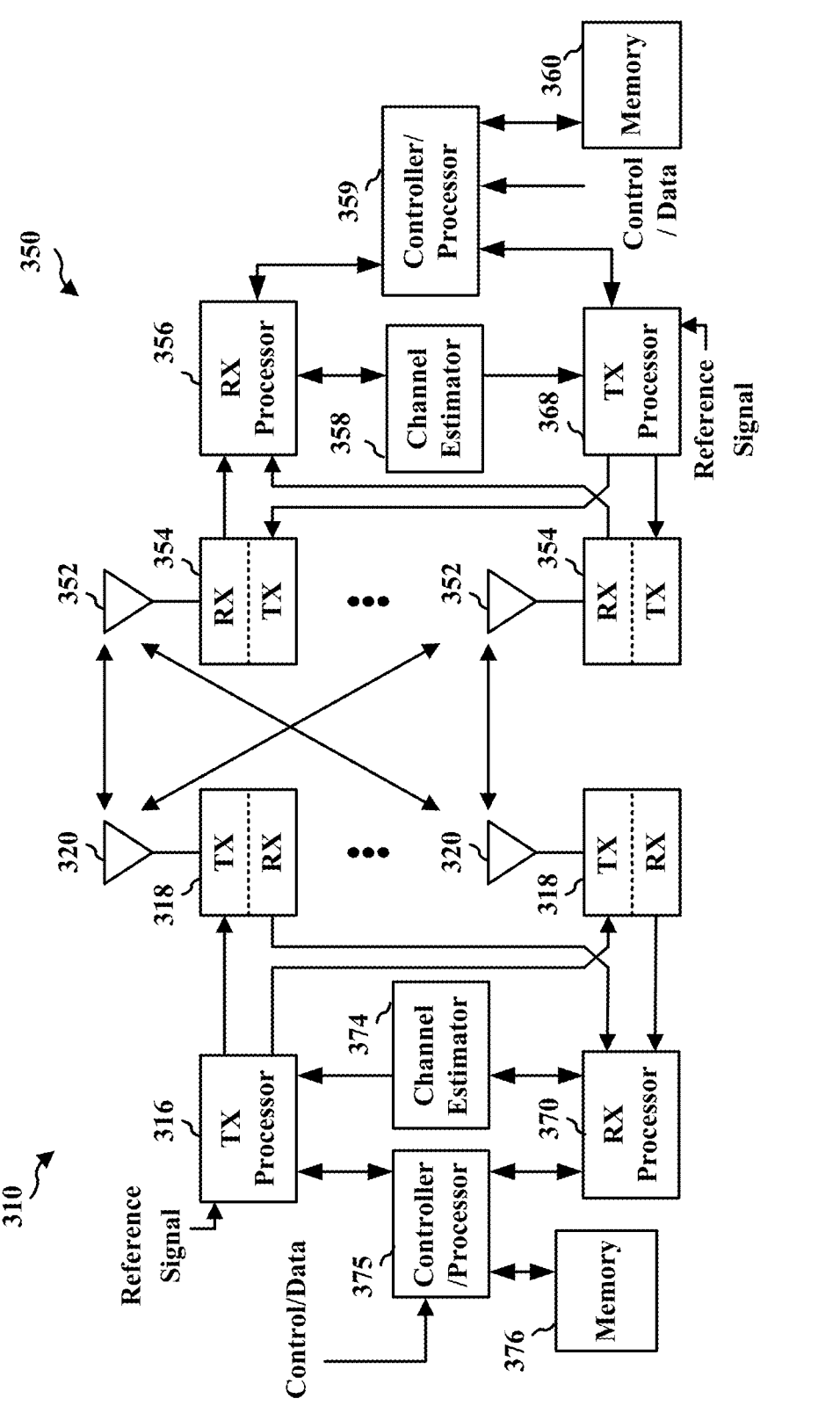
FIG. 3 is a diagram illustrating an example of a base station and user equipment (UE) in an access network.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (e.g., MIB, SIBs), RRC connection control (e.g., RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal and/or channel condition feedback transmitted by the UE 350. Each spatial stream may then be provided to a different antenna 320 via a separate transmitter 318 TX. Each transmitter 318 TX may modulate a radio frequency (RF) carrier with a respective spatial stream for transmission.

At the UE 350, each receiver 354 RX receives a signal through its respective antenna 352. Each receiver 354 RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK and/or NACK protocol to support HARQ operations.

Similar to the functionality described in connection with the DL transmission by the base station 310, the controller/processor 359 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK and/or NACK protocol to support HARQ operations.

At least one of the TX processor 368, the RX processor 356, and the controller/processor 359 may be configured to perform aspects in connection with 198 or 199 of FIG. 1.

At least one of the TX processor 316, the RX processor 370, and the controller/processor 375 may be configured to perform aspects in connection with 198 or 199 of FIG. 1.

Figure 4A:
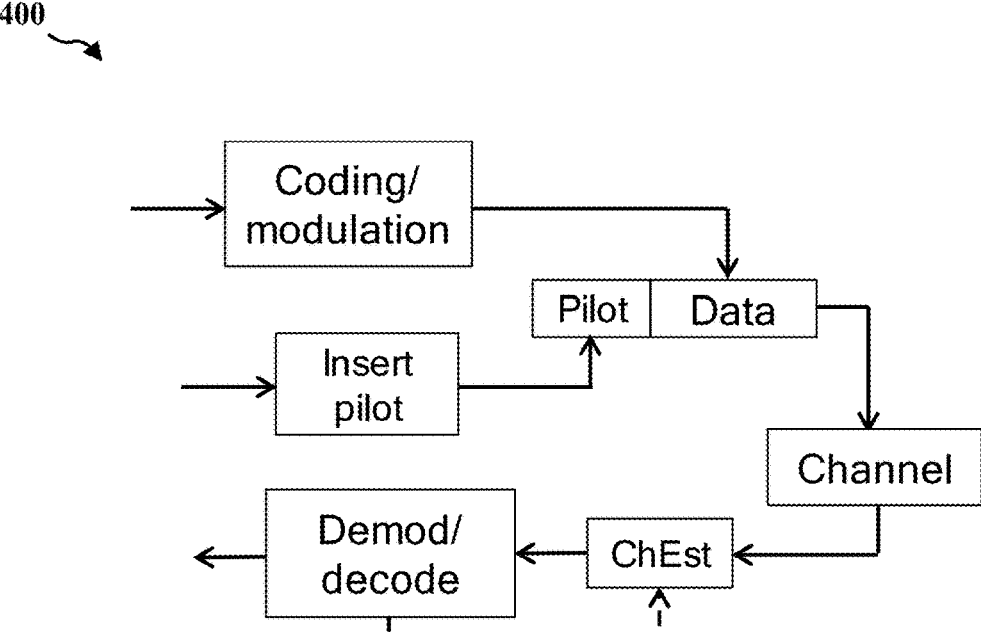
FIGS. 4A-4B illustrate examples of a coherent communication system and a noncoherent communication system.

Wireless communication systems may utilize coherent communication. In coherent communications, the wireless system may use a pilot or demodulated reference signal (DMRS) to assist the receiver to obtain the channel state information (CSI). For example, with reference to example 400 of FIG. 4A, DMRS and data may be transmitted by a transmitter, where a receiver is based on channel estimation followed by coherent demodulation/decoding. The DMRS-based communication may be suboptimal at low signal to noise ratio (SNR). The energy spent on DMRS does not contain any useful information, such that inclusion of DMRS at low SNR may reduce performance. For example, channel estimation quality may be degraded at low SNR, which may lead to significant performance degradation in demodulation/decoding at the receiver.

Figure 4B:
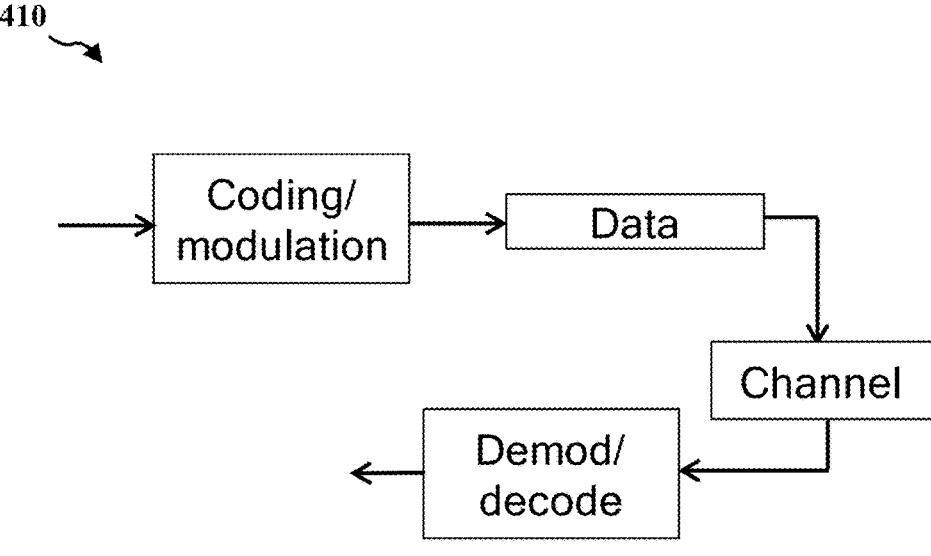

In an effort to improve performance at low SNR, noncoherent communication may be utilized. Noncoherent communication may refer to a communication system or scheme where the transmitter does not transmit any pilot signal or DMRS. For example, with reference to example 410 of FIG. 4B, the transmitter transmits the data to the receiver, and does not include a pilot signal or DMRS, as opposed to the example 400 of FIG. 4A. The receiver, in the noncoherent communication, may infer the information directly form the received signal without performing channel estimation. Channel estimates may be a byproduct of the receiving algorithm, after successful decoding of the received signal.

Noncoherent channel coding may utilize modified error correction codes over noncoherent fading channels. For example, noncoherent channel coding may utility modified RM codes over noncoherent fading channels. Conventional RM codes may be parameterized by a pair of integers r and m, which may be known as the RM(r,m) code, where r may refer to the order of the RM code (e.g., r-th order RM code), and m is an integer ≥0. Each codeword may have a length of $N=2^m$ and the number of information bits K that may be communicated with the code, may be expressed as $$K = \sum_{j=0}^{r} \binom{m}{j}.$$

One way to describe the encoder is through a generator matrix G of size K*N, where K is the number of information bits, and N is the number of coded bits, where the rows of the generator matrix are taken from the top K rows in a N*N Hadamard matrix $$\begin{bmatrix} 1 & 1 \\ 1 & 0 \end{bmatrix}^{\otimes m}$$

with the largest row weights. The row weight of a row vector of the matrix is the number of non-zero elements in the row vector. A Hadamard matrix can be generated by taking the tensor product of the $$\begin{bmatrix} 1 & 1 \\ 1 & 0 \end{bmatrix}_{2 \times 2}$$

matrix. However, conventional RM codes may not work over noncoherent fading channels due to phase ambiguity. For example, a noncoherent fading channel could randomly rotate the constellation of the signal, and as a result the phase information of the transmitted signal will be completely lost. In addition, conventional RM codes have the property that the contain a pair of codewords, such as a pair of vectors, where a second vector may be a bit flip version of the first vector. If such a pair of codewords is present in the codebook, then the receiver may not be able to detect whether the transmitted codeword is the first or second vector, due to the random phase rotation introduced by the unknown channel. Removal of the row with all ones (1) in the generator matrix may result in modified RM codes with length $N=2^m$ and the number of information bits is reduced by one and expressed by $$K = \sum_{j=0}^{r} \binom{m}{j}.$$

The modified RM code generated using the method disclosed herein may be decoded by the receiver through the channel, despite the channel introducing a random unknown phase to the received signal.

Figure 5:
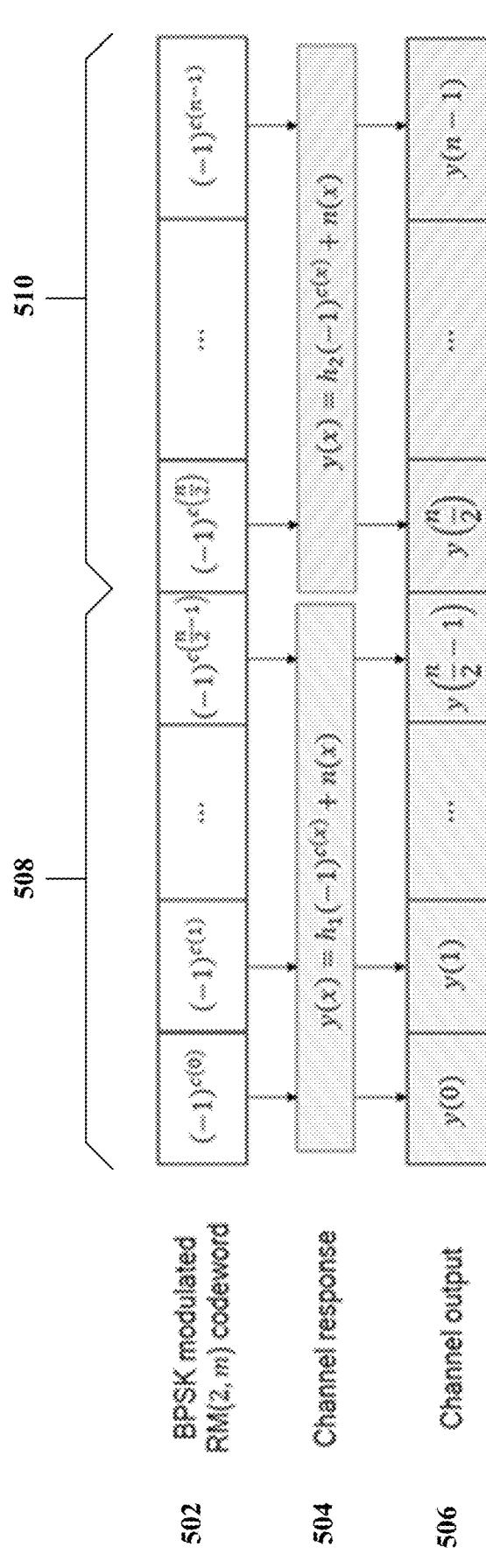
FIG. 5 illustrates an example of decoding algorithms.

Some of the decoding algorithms for the noncoherent RM codes may be sensitive to the phase changes of the fading channel coefficients. For example, with reference to the example 500 of FIG. 5, if a transmitter has two coded bits where the code is denoted by c(0), c(1), . . . c(n–1) and is modulated (e.g., BPSK). If two bits are transmitted over REs or symbols with very different channel realizations, then the receiver cannot jointly process the two REs or symbols. For example, a first half 508 of the codeword 502 experiences a first fading realization, while a second half 510 of the codeword 502 experiences a second fading realization, where the first and second fading realizations are different. This may be the case in the uplink of a cellular/mobile communication system with frequency hopping. For example, when the codes are transmitted with frequency hopping, the fading realizations on the different frequency hops of the same transmission may be very different. This may result in the problem, because some information bits of the RM code may be embedded on coded bits that are far away from each other. In particular, certain number of information bits for RM codes are embedded jointly on one symbol on the first half and on another symbol on the second half of the codeword. As such, if the channel response 504 has such a structure, then there is no way for the receiver to decode the channel output 506 having both information bits that are jointly coded on the two symbols that are far away from each other.

FIG. 6 illustrates an example 600 of an encoder. The example 600 of FIG. 6 shows the encoding of a modified $2^{nd}$ order RM code, where information bits are mapped to u1, u2, u3, u4, u5, u6 to generate a (6,8) code. The RM code may be notated as (2, 3), where the order of the RM code is 2, and m=3, such that the coded length is 8, where $x_0$-$x_7$ denote the coded bits. The modified RM code may put information bits on the location of u1, u2, u3, u4, u5, u6, while setting u0 and u7 to zero. The example 600 may represent the manner in which a RM code is encoded. The information bits are conveyed through the six locations u1, u2, u3, u4, u5, u6. The encoding works by combining various bit locations and then following the encoding chain to get x0, x1, x2, x3, x4, x5, x6, x7. For example, the information of u4, is mapped to two positions in the codeword, namely, x4 and x0, such that x4 contains some information about u4, while another coded bit that has information of u4 is x0. The information of u4 is conveyed through the coded bits x0 and x4. The receiver may compare x0 and x4 to determine u4. If the first half of the channel is x0-x3, and the second half of the channel is x4-x7, and the two channels are totally independent, then the receiver of the decoder will not be able to compare x0 and x4 because both x0 and x4 contain a random phase that is not known at the receiver. As such, the receiver will not be able to decode u4 correctly.

Aspects provided herein provide a configuration for an interleaver design for noncoherent error correction codes (e.g., RM codes). For example, an interleaver may be utilized after the noncoherent error correction code to permute the coded bits. In such instances, the interleaver may be configured to permute the coded bits into a same frequency hop or to close locations.

Figures 7A, 7B:
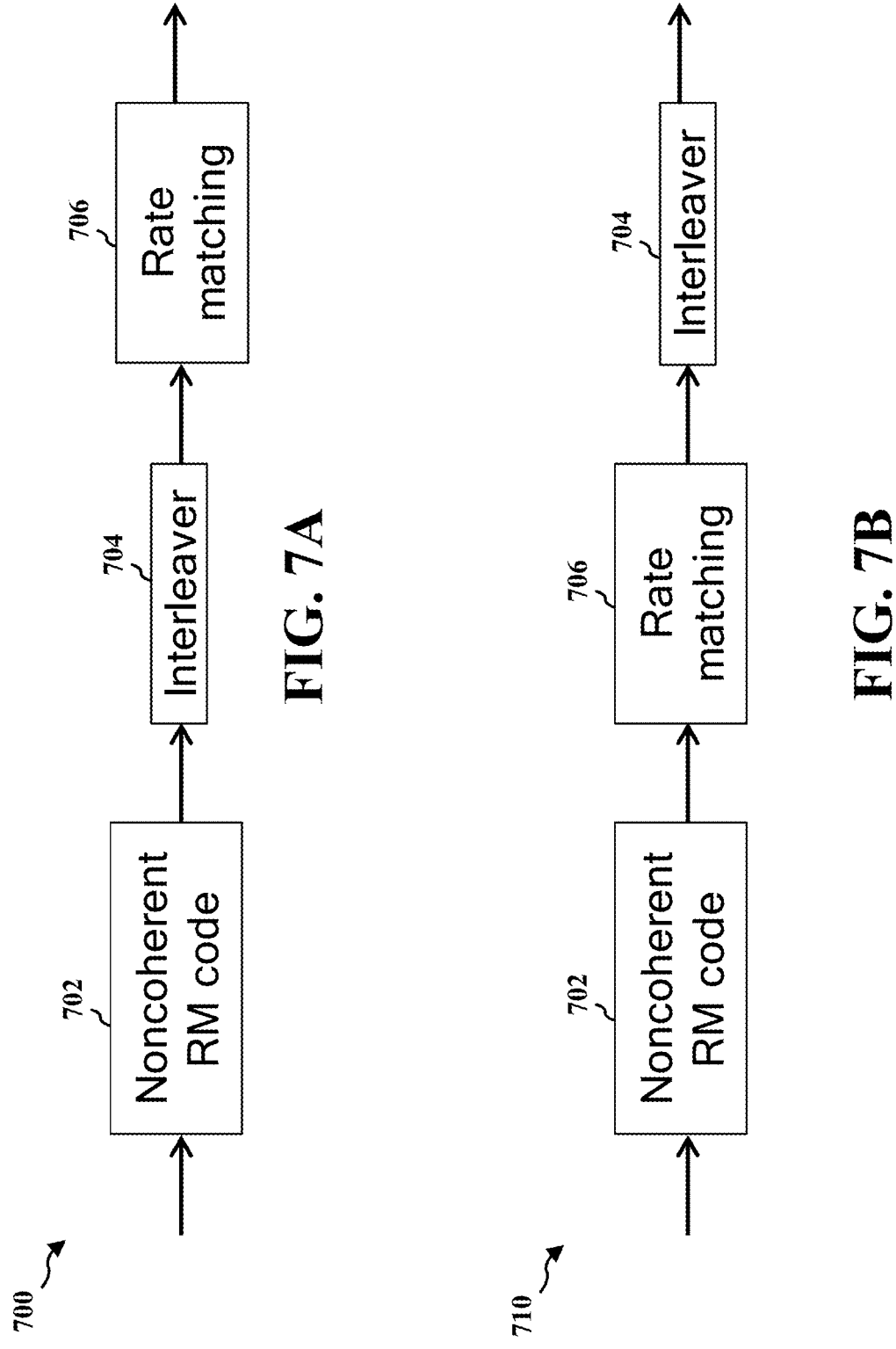
FIGS. 7A-7B illustrate examples of an interleaver.

FIGS. 7A-7B illustrate examples (700, 710) of an interleaver. The interleaver 704 may be utilized after the noncoherent error correction code 702 (e.g., 600 of FIG. 6) to permute the coded bits. The noncoherent error correction code 702 may comprise a noncoherent RM code. In some aspects, as shown in example 700 of FIG. 7A, the interleaver 704 may be placed before the rate matching 706. In some aspects, as shown in example 710 of FIG. 7B, the interleaver 704 may be placed after the rate matching 706. The interleaver 704 may be configured to break the structure of RM codes by permuting the order of the coded bits of the RM codes. With reference to the encoding structure of FIG. 6, the interleaver 704 may permute the locations of x0-x7, such that after the permutation x0 and x4 may be close to each other, thereby allowing the receiver to decode u4 based on the permuted version of x0 and x4.

In some aspects, a base station may configure a UE to enable/disable the interleaver for either uplink or downlink or both. The base station may also configure one of multiple interleavers for use by the UE (e.g., based on the channel condition). In some aspects, the base station may transmit to the UE a configuration enabling the interleaver, such that the interleaver performs the interleaving based on the received configuration. In some aspects, the base station may transmit to the UE a configuration indicating at least one interleaver process, such that the interleaver performs the interleaving based on the at least one interleaver process. The UE may select one interleaver process of the at least one interleaver process, such that the interleaver performs the interleaving based on the selected one interleaver process. In some aspects, the UE may transmit information to the base station indicating the selected one interleaver process.

Mathematically, an interleaver is a permutation function which maps an integer in {0, . . . , n–1} to another integer in {0, . . . , n–1} and is a one-to-one mapping. In some aspects, the interleaving may be performed based on an interleaver, where the interleaver may comprise one of a triangle interleaver, a pseudo-random interleaver, a feedback shift-register interleaver, a polynomial interleaver, or a look-up table based on interleaver. The interleavers may be used together with the noncoherent RM codes. In some aspects, the polynomial interleaver may be a permutation function defined based on a polynomial function $g(i)=(a_0+a_1 i+a_2 i^2+ \ldots +a_d i^d)$ mod n. The look-up table may explicitly indicate a mapping table.

Figure 8A:
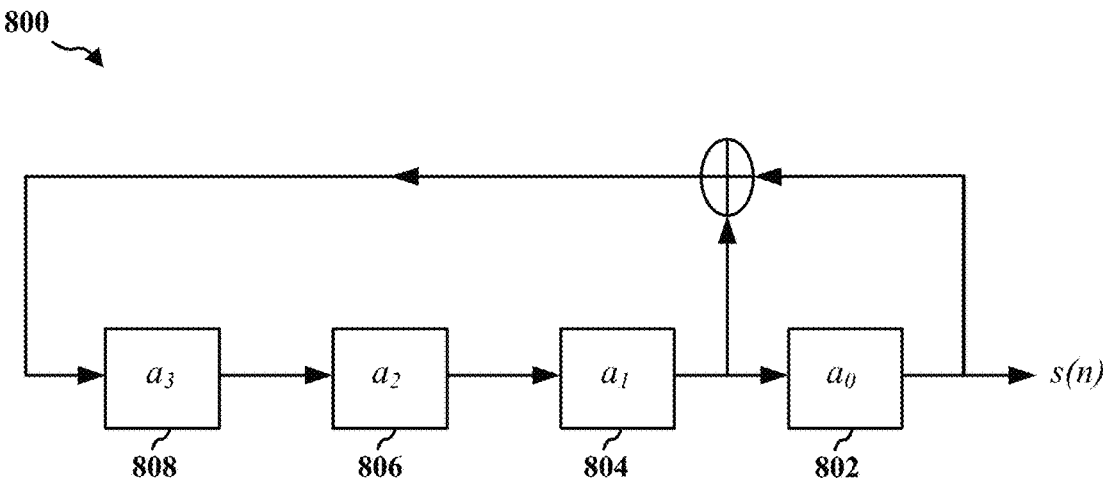
FIGS. 8A-8B illustrate examples of a configuration of an interleaver.

FIG. 8A illustrates an example 800 of an interleaver. The example 800 of FIG. 8A may comprise a feedback shift register interleaver, which may also be known as a convolutional interleaver. The interleaver may comprise a plurality of feedback shift registers (e.g., $a_0$ 802, $a_1$ 804, $a_2$ 806, $a_3$ 808). The index of the permuted sequences may be read from the bits in the feedback shift register of length m. For example, the next value of register $a_3$ 808 in a feedback shift register of length 4 may be determined by the modulo-2 sum of $a_0$ 802 and $a_1$ 804. A feedback shift-register interleaver of length n may contain $m=\lceil \log_2 n \rceil$ bits in the register, and the bits at a given instance (e.g., the i-th instance) may corresponds to a decimal integer $g(i)=2^{m-1}\cdot a_{m-1}+2^{m-2}\cdot a_{m-2}+ \ldots +2\cdot a_1+a_0$ which may represent the permutated value of i.

Figure 8B:
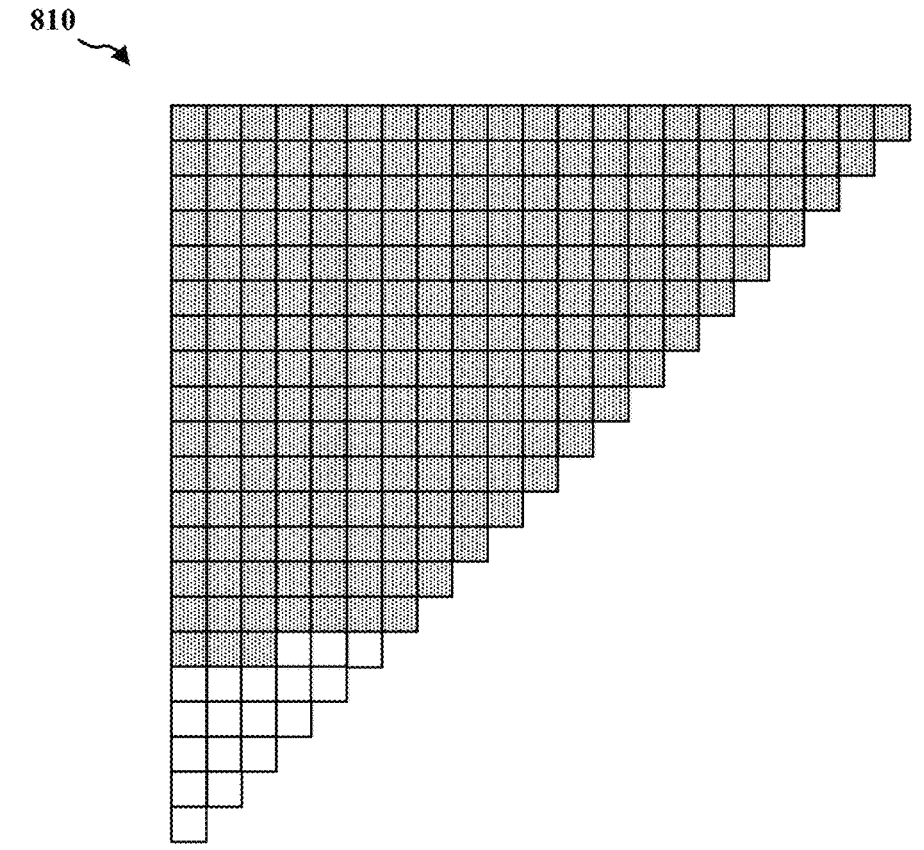

FIG. 8B illustrates an example 810 of an interleaver. The example 810 of FIG. 8B may comprise a triangle interleaver. In aspects where a triangle interleaver is used, the transmitter may write the encoded bits into each of the grid in the triangle, for example as shown in FIG. 8B. The writing may be done row-by-row, that is, first N bits may be written in the first row, and the N–1 bits may be written in the second row, and so on. The transmitter may then read the bits from the same triangle column-by-column, that is, first read the bits from the first column, and then read the bits from the second column, and so on.

FIG. 9 is a call flow diagram 900 of signaling between a first device 902 and a second device 904. In some aspects, the first device 902 may be a UE or a base station. In some aspect, the second device 904 may be a base station or a UE. In aspects where the first or second device is a base station, the base station may be configured to provide at least one cell. In aspects where the first or second device is a UE, the UE may be configured to communicate with the base station. For example, in the context of FIG. 1, the base station may correspond to base station 102/180 and, accordingly, the cell may include a geographic coverage area 110 in which communication coverage is provided and/or small cell 102' having a coverage area 110'. Further, a UE may correspond to at least UE 104. In another example, in the context of FIG. 3, the base station may correspond to base station 310 and the UE may correspond to UE 350.

As illustrated at 906, the second device 904 may transmit a configuration enabling an interleaving of a first codeword. In some aspects, the second device 904 may transmit the configuration enabling the interleaving of the first codeword via RRC signaling, MAC-CE, or the like. The second device 904 may transmit the configuration enabling the interleaving of the first codeword to a first device 902. In some aspects, the second device 904 may transmit a configuration indicating at least one interleaver for interleaving the first codeword. The second device 904 may transmit the configuration indicating the at least one interleaver for interleaving the first codeword to the first device 902. The first device 902 may receive the configuration from the second device 904.

As illustrated at 908, the first device 902 may encode a set of bits based on a noncoherent error correction code. In some aspects, the noncoherent error correction code may comprise a noncoherent RM code. The first device may encode the set of bits based on the noncoherent RM code to generate the first codeword.

As illustrated at 910, the first device 902 may rate match the generated first codeword. In some aspects, the first device may rate match the generated first codeword before interleaving the first codeword. The interleaving of the first codeword may comprise interleaving the rate matched first codeword.

As illustrated at 912, the first device 902 may select one interleaver of the configured at least one interleaver. The first device 902 may select one interleaver of the configuration indicating at least one interleaver for interleaving the first codeword. The interleaving may be based on the selected one interleaver. In some aspects, first device 902 may select an interleaver for interleaving the first codeword. The interleaver may be selected based on one of a received configuration or a channel estimation of a channel for transmitting a second codeword. For example, the first device 902 may select an interleaver based on channel conditions detected at the first device 902. In some aspects, the first device 902 may select an interleaver based on channel conditions indicated to the first device 902 from the second device 904.

As illustrated at 914, the first device 902 may interleave the first codeword. The first device 902 may interleave the first codeword to permute the coded bits of the first codeword into the second codeword. In some aspects, the interleaving may be performed based on an interleaver. The interleaver may comprise one of a triangle interleaver, a pseudo-random interleaver, a feedback shift-register interleaver, a polynomial interleaver, or a look-up table based on interleaver.

As illustrated at 916, the first device 902 may rate match the generated second codeword. The first device 902 may rate match the generated second codeword before transmitting the second codeword. The rate matching may be performed on the first codeword prior to the interleaving of the first codeword, or after the interleaving of the first codeword, such that the rate matching is performed on the generated second codeword.

As illustrated at 918, the first device 902 may transmit the second codeword to the second device 904. The second device 904 may receive the second codeword from the first device 902. In some aspects, a first portion and a second portion of the second codeword may be transmitted frequency division duplexed or time division duplexed. In some aspects, transmitting the second codeword may comprise transmitting the rate matched second codeword. In some aspects, transmitting the second codeword may comprise transmitting the interleaved first codeword that generates to second codeword.

As illustrated at 920, the first device 902 may transmit information indicating an interleaver used for interleaving the first codeword. The first device 902 may transmit the information indicating the interleaver used to the second device 904. The second device 904 may receive the information indicating the interleaver used by the first device 902 for interleaving the first codeword. In some aspects, the first device 902 may transmit information to the second device 904 indicating the selected one interleaver from the configuration indicating at least one interleaver for interleaving the first codeword.

As illustrated at 922, the second device 904 may de-interleave the second codeword. The second device 904 may de-interleave the second codeword to permute coded bits of the second codeword into the first codeword. In some aspects, the de-interleaving may be performed based on an interleaver used by the first device 902 to interleave the first codeword to generate the second codeword. The interleaver may comprise one of a triangle interleaver, a pseudo-random interleaver, a feedback shift-register interleaver, a polynomial interleaver, or a look-up table based on interleaver. In some aspects, the de-interleaving may be performed based on the transmitted configuration enabling the interleaver of the first codeword. In some aspects, the de-interleaving may be performed based on the transmitted configuration indicating the at least one interleaver for interleaving the first codeword.

As illustrated at 924, the second device 904 may decode the second codeword. The second device 904 may decode the second codeword into a set of bits based on a noncoherent error correction code (e.g., noncoherent RM code).

Figure 10:
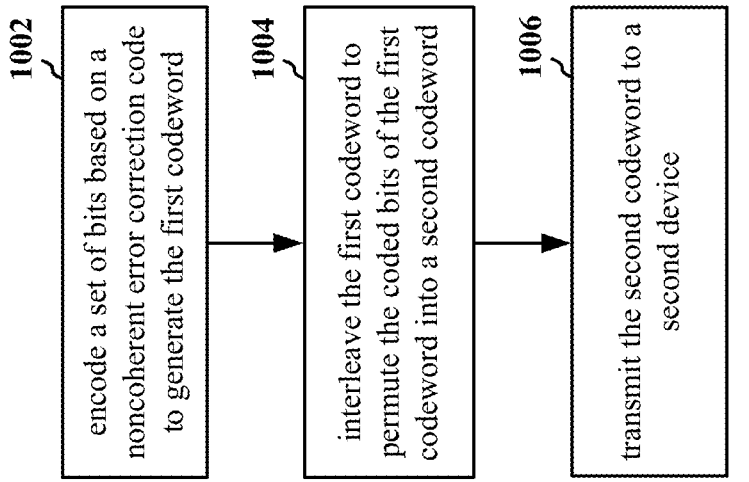
FIG. 10 is a flowchart of a method of wireless communication.

FIG. 10 is a flowchart 1000 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). The method may be performed by a base station or a component of a base station (e.g., the base station 102/180; the apparatus 1202; the cellular baseband processor 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a first device to interleave a codeword, where the codeword is based on an enhanced noncoherent error correction code.

At 1002, the first device may encode a set of bits based on a noncoherent error correction code. For example, 1002 may be performed by encode component 1242 of apparatus 1202. In some aspects, the noncoherent error correction code may comprise a noncoherent RM code. The first device may encode the set of bits based on the noncoherent RM code to generate the first codeword.

At 1004, the first device may interleave the first codeword. For example, 1004 may be performed by interleave component 1248 of apparatus 1202. The first device may interleave the first codeword to permute the coded bits of the first codeword into the second codeword. In some aspects, the interleaving may be performed based on an interleaver. The interleaver may comprise one of a triangle interleaver, a pseudo-random interleaver, a feedback shift-register interleaver, a polynomial interleaver, or a look-up table based on interleaver.

At 1006, the first device may transmit the second codeword to a second device. For example, 1006 may be performed by codeword component 1250 of apparatus 1202. In some aspects, a first portion and a second portion of the second codeword may be transmitted frequency division duplexed or time division duplexed. In some aspects, transmitting the second codeword may comprise transmitting the rate matched second codeword.

FIG. 11 is a flowchart 1100 of a method of wireless communication. The method may be performed by a UE or a component of a UE (e.g., the UE 104; the apparatus 1202; the cellular baseband processor 1204, which may include the memory 360 and which may be the entire UE 350 or a component of the UE 350, such as the TX processor 368, the RX processor 356, and/or the controller/processor 359). The method may be performed by a base station or a component of a base station (e.g., the base station 102/180; the apparatus 1202; the cellular baseband processor 1204, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a first device to interleave a codeword, where the codeword is based on an enhanced noncoherent error correction code.

At 1102, the first device may receive a configuration enabling an interleaving of a first codeword. For example, 1102 may be performed by configuration component 1240 of apparatus 1202. The first device may receive the configuration enabling the interleaving of the first codeword from a second device. The interleaving may be performed based on the received configuration.

At 1104, the first device may receive a configuration indicating at least one interleaver for interleaving the first codeword. For example, 1104 may be performed by configuration component 1240 of apparatus 1202. The first device may receive the configuration indicating the at least one interleaver for interleaving the first codeword from the second device. The interleaving may be based on the received configuration.

At 1106, the first device may encode a set of bits based on a noncoherent error correction code. For example, 1106 may be performed by encode component 1242 of apparatus 1202. In some aspects, the noncoherent error correction code may comprise a noncoherent RM code. The first device may encode the set of bits based on the noncoherent RM code to generate the first codeword.

At 1108, the first device may rate match the generated first codeword. For example, 1108 may be performed by rate match component 1244 of apparatus 1202. The first device may rate match the generated first codeword before interleaving the first codeword. The interleaving of the first codeword may comprise interleaving the rate matched first codeword.

At 1110, the first device may select one interleaver of the configured at least one interleaver. For example, 1110 may be performed by selection component 1246 of apparatus 1202. The first device may select one interleaver of the configuration indicating at least one interleaver for interleaving the first codeword. The interleaving may be based on the selected one interleaver.

At 1112, the first device may select an interleaver for interleaving the first codeword. For example, 1112 may be performed by selection component 1246 of apparatus 1202. The interleaver may be selected based on one of a received configuration or a channel estimation of a channel for transmitting a second codeword.

At 1114, the first device may interleave the first codeword. For example, 1114 may be performed by interleave component 1248 of apparatus 1202. The first device may interleave the first codeword to permute the coded bits of the first codeword into the second codeword. In some aspects, the interleaving may be performed based on an interleaver. The interleaver may comprise one of a triangle interleaver, a pseudo-random interleaver, a feedback shift-register interleaver, a polynomial interleaver, or a look-up table based on interleaver.

At 1116, the first device may rate match the generated second codeword. For example, 1116 may be performed by rate match component 1244 of apparatus 1202. The first device may rate match the generated second codeword before transmitting the second codeword.

At 1118, the first device may transmit the second codeword to a second device. For example, 1118 may be performed by codeword component 1250 of apparatus 1202. In some aspects, a first portion and a second portion of the second codeword may be transmitted frequency division duplexed or time division duplexed. In some aspects, transmitting the second codeword may comprise transmitting the rate matched second codeword.

At 1120, the first device may transmit information indicating an interleaver used for interleaving the first codeword. For example, 1120 may be performed by interleave component 1248 of apparatus 1202. The first device may transmit the information indicating the interleaver used to the second device. In some aspects, the first device may transmit information to the second device indicating the selected one interleaver from the configuration indicating at least one interleaver for interleaving the first codeword.

Figure 12:
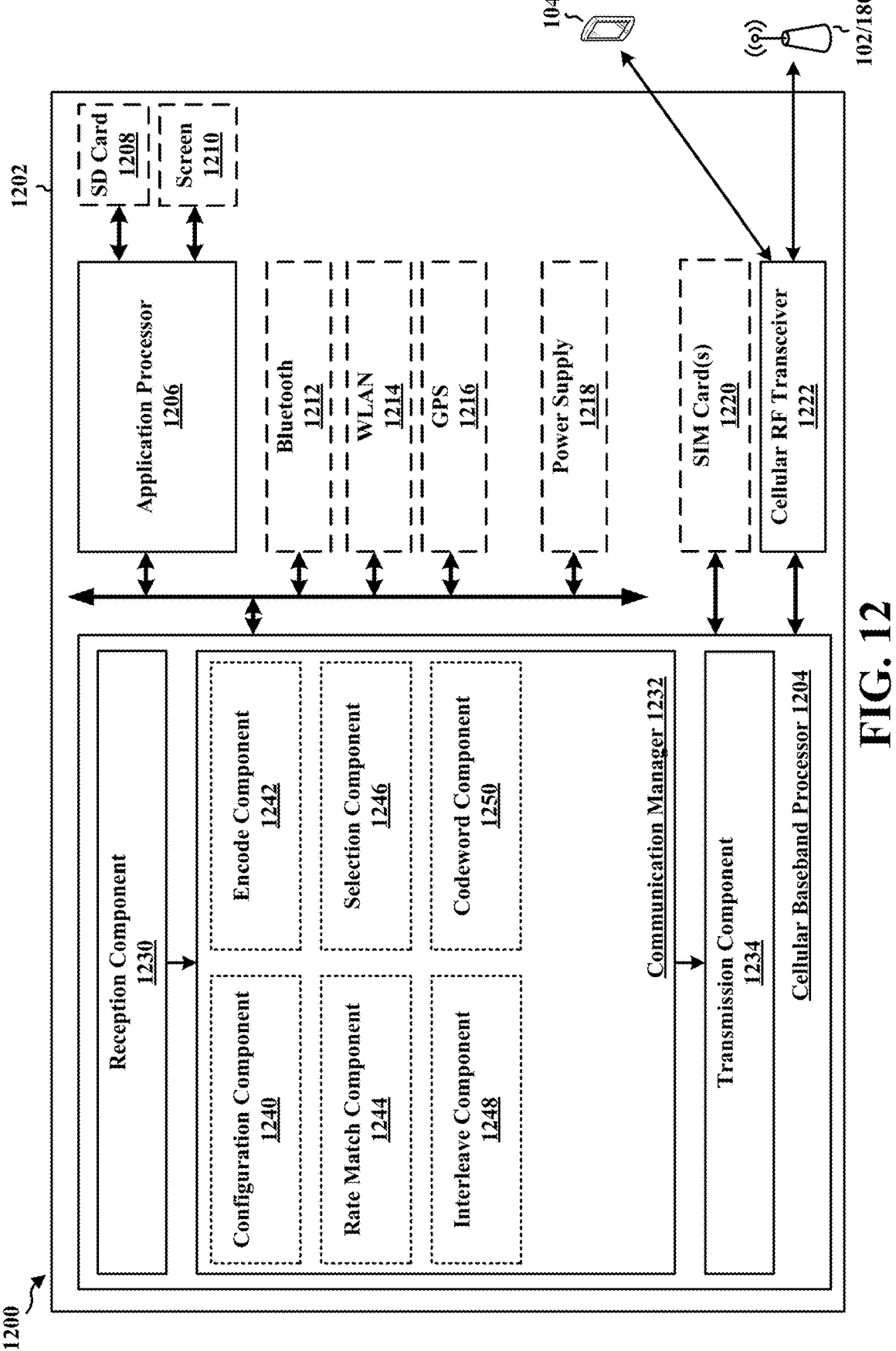
FIG. 12 is a diagram illustrating an example of a hardware implementation for an example apparatus.

FIG. 12 is a diagram 1200 illustrating an example of a hardware implementation for an apparatus 1202. In some aspects, the apparatus 1202 may be a UE, a component of a UE, or may implement UE functionality. In some aspects, the apparatus 1202 may be a base station, a component of a base station, or may implement base station functionality. In some aspects, the apparatus 1202 may include a cellular baseband processor 1204 (also referred to as a modem) coupled to a cellular RF transceiver 1222. In aspects where the apparatus 1202 is a UE, the apparatus 1202 may further include one or more subscriber identity modules (SIM) cards 1220, an application processor 1206 coupled to a secure digital (SD) card 1208 and a screen 1210, a Bluetooth module 1212, a wireless local area network (WLAN) module 1214, a Global Positioning System (GPS) module 1216, or a power supply 1218. The cellular baseband processor 1204 communicates through the cellular RF transceiver 1222 with the UE 104 and/or base station 102/180. The cellular baseband processor 1204 may include a computer-readable medium/memory. The computer-readable medium/memory may be non-transitory. The cellular baseband processor 1204 is responsible for general processing, including the execution of software stored on the computer-readable medium/memory. The software, when executed by the cellular baseband processor 1204, causes the cellular baseband processor 1204 to perform the various functions described supra. The computer-readable medium/memory may also be used for storing data that is manipulated by the cellular baseband processor 1204 when executing software. The cellular baseband processor 1204 further includes a reception component 1230, a communication manager 1232, and a transmission component 1234. The communication manager 1232 includes the one or more illustrated components. The components within the communication manager 1232 may be stored in the computer-readable medium/memory and/or configured as hardware within the cellular baseband processor 1204. In some aspects, the cellular baseband processor 1204 may be a component of the UE 350 and may include the memory 360 and/or at least one of the TX processor 368, the RX processor 356, and the controller/processor 359. In one configuration, the apparatus 1202 may be a modem chip and include just the baseband processor 1204, and in another configuration, the apparatus 1202 may be the entire UE (e.g., see 350 of FIG. 3) and include the additional modules of the apparatus 1202. In some aspects, the cellular baseband processor 1204 may be a component of the base station 310 and may include the memory 376 and/or at least one of the TX processor 316, the RX processor 370, and the controller/processor 375.

The communication manager 1232 includes a configuration component 1240 that is configured to receive a configuration enabling an interleaving of a first codeword, e.g., as described in connection with 1102 of FIG. 11. The configuration component 1240 is further configured to receive a configuration indicating at least one interleaver for interleaving the first codeword, e.g., as described in connection with 1104 of FIG. 11. The communication manager 1232 further includes an encode component 1242 that is configured to encode a set of bits based on a noncoherent error correction code, e.g., as described in connection with 1002 of FIG. 10 or 1106 of FIG. 11. The communication manager 1232 further includes a rate match component 1244 that is configured to rate match the generated first codeword, e.g., as described in connection with 1108 of FIG. 11. The rate match component 1244 is further configured to rate match the generated second codeword, e.g., as described in connection with 1116 of FIG. 11. The communication manager 1232 further includes a selection component 1246 that is configured to select one interleaver of the configured at least one interleaver, e.g., as described in connection with 1110 of FIG. 11. The selection component is further configured to select an interleaver for interleaving the first codeword, e.g., as described in connection with 1112 of FIG. 11. The communication manager 1232 further includes an interleave component 1248 that is configured to interleave the first codeword, e.g., as described in connection with 1004 of FIG. 10 or 1114 of FIG. 11. The interleave component 1248 is further configured to transmit information indicating an interleaver used for interleaving the first codeword, e.g., as described in connection with 1120 of FIG. 11. The communication manager 1232 further includes a codeword component 1250 that is configured to transmit the second codeword to a second device, e.g., as described in connection with 1006 of FIG. 10 or 1118 of FIG. 11.

The apparatus may include additional components that perform each of the blocks of the algorithm in the flowcharts of FIGS. 10 and 11. As such, each block in the flowcharts of FIGS. 10 and 11 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1202 may include a variety of components configured for various functions. In one configuration, the apparatus 1202, and in particular the cellular baseband processor 1204, includes means for encoding a set of bits based on a noncoherent error correction code to generate a first codeword. The apparatus includes means for interleaving the first codeword to permute coded bits of the first codeword into a second codeword. The apparatus includes means for transmitting the second codeword to a second device. The apparatus further includes means for rate matching the generated first codeword before interleaving the first codeword, the interleaving the first codeword comprising interleaving the rate matched first codeword. The apparatus further includes means for rate matching the generated second codeword before transmitting the second codeword, the transmitting comprising transmitting the rate matched second codeword. The apparatus further includes means for receiving, from the second device, a configuration enabling the interleaving of the first codeword. The interleaving is performed based on the received configuration. The apparatus further includes means for receiving, from the second device, a configuration indicating at least one interleaver for interleaving the first codeword. The interleaving is based on the received configuration. The apparatus further includes means for selecting one interleaver of the configured at least one interleaver. The interleaving is based on the selected one interleaver. The apparatus further includes means for transmitting information to the second device indicating the selected one interleaver. The apparatus further includes means for transmitting information to the second device indicating an interleaver used for interleaving the first codeword. The apparatus further includes means for selecting an interleaver for interleaving the first codeword, the interleaver being selected based on one of a received configuration, or a channel estimation of a channel for transmitting the second codeword. The means may be one or more of the components of the apparatus 1202 configured to perform the functions recited by the means. As described supra, the apparatus 1202 may include the TX Processor 368, the RX Processor 356, and the controller/processor 359. As such, in one configuration, the means may be the TX Processor 368, the RX Processor 356, and the controller/processor 359 configured to perform the functions recited by the means.

FIG. 13 is a flowchart 1300 of a method of wireless communication. The method may be performed by a UE or a component of a UE (e.g., the UE 104; the apparatus 1502; the cellular baseband processor 1504, which may include the memory 360 and which may be the entire UE 350 or a component of the UE 350, such as the TX processor 368, the RX processor 356, and/or the controller/processor 359). The method may be performed by a base station or a component of a base station (e.g., the base station 102/180; the apparatus 1502; the cellular baseband processor 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a second device to configure a first device to interleave a codeword, where the codeword is based on an enhanced noncoherent error correction code.

At 1302, the second device may receive a first codeword. For example, 1302 may be performed by codeword component 1542 of apparatus 1502. The second device may receive the first codeword from the first device. In some aspects, a first portion and a second portion of the first codeword may be transmitted frequency division duplexed or time division duplexed.

At 1304, the second device may de-interleave the first codeword. For example, 1304 may be performed by de-interleave component 1544 of apparatus 1502. The second device may de-interleave the first codeword to permute coded bits of the first codeword into a second codeword. In some aspects, the de-interleaving may be performed based on an interleaver. The interleaver may comprise one of a triangle interleaver, a pseudo-random interleaver, a feedback shift-register interleaver, a polynomial interleaver, or a lookup table based on interleaver. In some aspects, the de-interleaving may be performed based on the transmitted configuration enabling the interleaver of the first codeword.

In some aspects, the de-interleaving may be performed based on the transmitted configuration indicating the at least one interleaver for interleaving the first codeword.

At 1306, the second device may decode the second codeword. For example, 1306 may be performed by decode component 1548 of apparatus 1502. The second device may decode the second codeword into a set of bits based on a noncoherent error correction code. In some aspects, the noncoherent error correction code may comprise a noncoherent RM code.

FIG. 14 is a flowchart 1400 of a method of wireless communication. The method may be performed by a UE or a component of a UE (e.g., the UE 104; the apparatus 1502; the cellular baseband processor 1504, which may include the memory 360 and which may be the entire UE 350 or a component of the UE 350, such as the TX processor 368, the RX processor 356, and/or the controller/processor 359). The method may be performed by a base station or a component of a base station (e.g., the base station 102/180; the apparatus 1502; the cellular baseband processor 1504, which may include the memory 376 and which may be the entire base station 310 or a component of the base station 310, such as the TX processor 316, the RX processor 370, and/or the controller/processor 375). One or more of the illustrated operations may be omitted, transposed, or contemporaneous. The method may allow a second device to configure a first device to interleave a codeword, where the codeword is based on an enhanced noncoherent error correction code.

At 1402, the second device may transmit a configuration enabling an interleaving of a first codeword. For example, 1402 may be performed by configuration component 1540 of apparatus 1502. The second device may transmit the configuration enabling the interleaving of the first codeword to a first device.

At 1404, the second device may transmit a configuration indicating at least one interleaver for interleaving the first codeword. For example, 1404 may be performed by configuration component 1540 of apparatus 1502. The second device may transmit the configuration indicating the at least one interleaver for interleaving the first codeword to the first device.

At 1406, the second device may receive a first codeword. For example, 1406 may be performed by codeword component 1542 of apparatus 1502. The second device may receive the first codeword from the first device. In some aspects, a first portion and a second portion of the first codeword may be transmitted frequency division duplexed or time division duplexed.

At 1408, the second device may de-interleave the first codeword. For example, 1408 may be performed by de-interleave component 1544 of apparatus 1502. The second device may de-interleave the first codeword to permute coded bits of the first codeword into a second codeword. In some aspects, the de-interleaving may be performed based on an interleaver. The interleaver may comprise one of a triangle interleaver, a pseudo-random interleaver, a feedback shift-register interleaver, a polynomial interleaver, or a look-up table based on interleaver. In some aspects, the de-interleaving may be performed based on the transmitted configuration enabling the interleaver of the first codeword. In some aspects, the de-interleaving may be performed based on the transmitted configuration indicating the at least one interleaver for interleaving the first codeword.

At 1410, the second device may receive information indicating a selected one interleaver of the at least one interleaver. For example, 1410 may be performed by information component 1546 of apparatus 1502. The second device may receive the information indicating the selected one interleaver of the at least one interleaver from the first device. The de-interleaving may be based on the selected one interleaver.

At 1412, the second device may receive information indicating an interleaver used for interleaving the first codeword. For example, 1412 may be performed by information component 1546 of apparatus 1502. The second device may receive the information indicating the interleaver used for interleaving the first codeword from the first device. The de-interleaving may be based on the interleaver used, by the first device, to interleave the first codeword.

At 1414, the second device may decode the second codeword. For example, 1414 may be performed by decode component 1548 of apparatus 1502. The second device may decode the second codeword into a set of bits based on a noncoherent error correction code. In some aspects, the noncoherent error correction code may comprise a noncoherent RM code.

Figure 15:
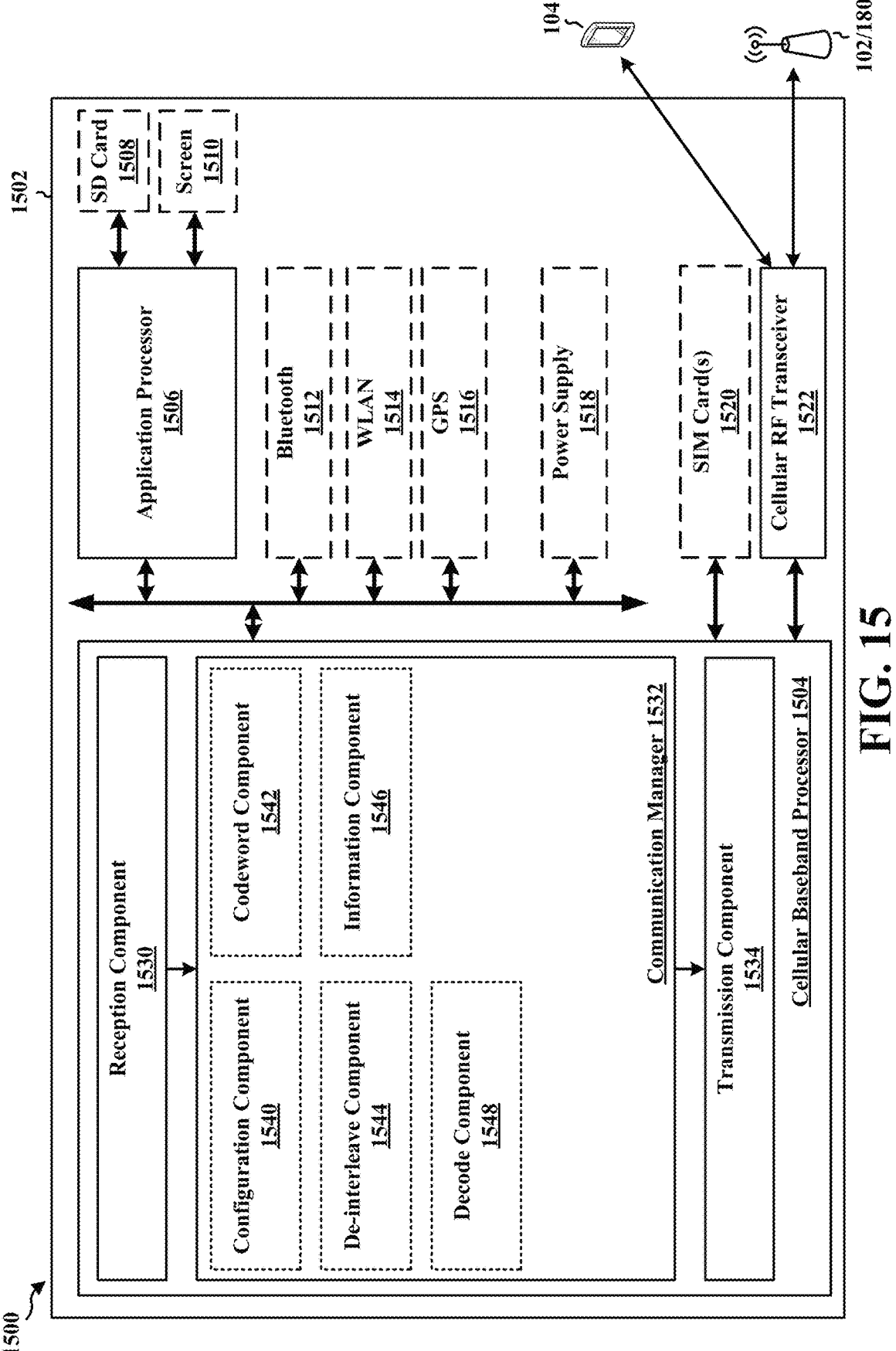
FIG. 15 is a diagram illustrating an example of a hardware implementation for an example apparatus.

FIG. 15 is a diagram 1500 illustrating an example of a hardware implementation for an apparatus 1502. In some aspects, the apparatus 1502 may be a UE, a component of a UE, or may implement UE functionality. In some aspects, the apparatus 1502 may be a base station, a component of a base station, or may implement base station functionality. In some aspects, the apparatus 1502 may include a cellular baseband processor 1504 (also referred to as a modem) coupled to a cellular RF transceiver 1522. In aspects where the apparatus 1502 is a UE, the apparatus 1502 may comprise one or more subscriber identity modules (SIM) cards 1520, an application processor 1506 coupled to a secure digital (SD) card 1508 and a screen 1510, a Bluetooth module 1512, a wireless local area network (WLAN) module 1514, a Global Positioning System (GPS) module 1516, and a power supply 1518. The cellular baseband processor 1504 may communicate through a cellular RF transceiver 1522 with the UE 104 and/or base station 102/180. The cellular baseband processor 1504 may include a computer-readable medium/memory. The computer-readable medium/memory may be non-transitory. The cellular baseband processor 1504 is responsible for general processing, including the execution of software stored on the computer-readable medium/memory. The software, when executed by the cellular baseband processor 1504, causes the cellular baseband processor 1504 to perform the various functions described supra. The computer-readable medium/memory may also be used for storing data that is manipulated by the cellular baseband processor 1504 when executing software. The cellular baseband processor 1504 further includes a reception component 1530, a communication manager 1532, and a transmission component 1534. The communication manager 1532 includes the one or more illustrated components. The components within the communication manager 1532 may be stored in the computer-readable medium/memory and/or configured as hardware within the cellular baseband processor 1504. In some aspects, the cellular baseband processor 1504 may be a component of the UE 350 and may include the memory 360 and/or at least one of the TX processor 368, the RX processor 356, and the controller/processor 359. In one configuration, the apparatus 1502 may be a modem chip and include just the baseband processor 1504, and in another configuration, the apparatus 1502 may be the entire UE (e.g., see 350 of FIG. 3) and include the additional modules of the apparatus 1502. In some aspects, the cellular baseband processor 1504 may be a component of the base station 310 and may include the memory 376 and/or at least one of the TX processor 316, the RX processor 370, and the controller/processor 375.

The communication manager 1532 includes a configuration component 1540 that may transmit a configuration enabling an interleaving of a first codeword e.g., as described in connection with 1402 of FIG. 14. The configuration component 1540 may be further configured to transmit a configuration indicating at least one interleaver for interleaving the first codeword, e.g., as described in connection with 1404 of FIG. 14. The communication manager 1532 further includes a codeword component 1542 that may receive a first codeword, e.g., as described in connection with 1302 of FIG. 13 or 1406 of FIG. 14. The communication manager 1532 further includes a de-interleave component 1544 that may de-interleave the first codeword, e.g., as described in connection with 1304 of FIG. 13 or 1408 of FIG. 14. The communication manager 1532 further includes an information component 1546 that may receive information indicating a selected one interleaver of the at least one interleaver, e.g., as described in connection with 1410 of FIG. 14. The information component 1546 may be further configured to receive information indicating an interleaver used for interleaving the first codeword, e.g., as described in connection with 1412 of FIG. 14. The communication manager 1532 further includes a decode component 1548 that may decode the second codeword, e.g., as described in connection with 1306 of FIG. 13 or 1414 of FIG. 14.

The apparatus may include additional components that perform each of the blocks of the algorithm in the flowcharts of FIGS. 13 and 14. As such, each block in the flowcharts of FIGS. 13 and 14 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

As shown, the apparatus 1502 may include a variety of components configured for various functions. In one configuration, the apparatus 1502, and in particular the cellular baseband processor 1504, includes means for receiving a first codeword from a first device. The apparatus includes means for de-interleaving the first codeword to permute coded bits of the first codeword into a second codeword. The apparatus includes means for decoding the second codeword into a set of bits based on a noncoherent error correction code. The apparatus further includes means for transmitting, to the first device, a configuration enabling an interleaving of the first codeword. The de-interleaving is performed based on the transmitted configuration. The apparatus further includes means for transmitting, to the first device, a configuration indicating at least one interleaver for interleaving the first codeword. The de-interleaving is based on the transmitted configuration. The apparatus further includes means for receiving information from the first device indicating a selected one interleaver of the at least one interleaver. The de-interleaving is based on the selected one interleaver. The apparatus further includes means for receiving information from the first device indicating an interleaver used for interleaving the first codeword. The de-interleaving is based on the interleaver used to interleave the first codeword. The means may be one or more of the components of the apparatus 1502 configured to perform the functions recited by the means. As described supra, the apparatus 1502 may include the TX Processor 316, the RX Processor 370, and the controller/processor 375. As such, in one configuration, the means may be the TX Processor 316, the RX Processor 370, and the controller/processor 375 configured to perform the functions recited by the means.

It is understood that the specific order or hierarchy of blocks in the processes/flowcharts disclosed is an illustration of example approaches. Based upon design preferences, it is understood that the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Terms such as "if," "when," and "while" should be interpreted to mean "under the condition that" rather than imply an immediate temporal relationship or reaction. That is, these phrases, e.g., "when," do not imply an immediate action in response to or during the occurrence of an action, but simply imply that if a condition is met then an action will occur, but without requiring a specific or immediate time constraint for the action to occur. The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, and/or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

The following aspects are illustrative only and may be combined with other aspects or teachings described herein, without limitation.

Aspect 1 is an apparatus for wireless communication at a first wireless device including at least one processor coupled to a memory and configured to encode a set of bits based on a noncoherent error correction code to generate a first codeword; interleave the first codeword to permute coded bits of the first codeword into a second codeword; and transmit the second codeword to a second device.

Aspect 2 is the apparatus of aspect 1, further including a transceiver coupled to the at least one processor.

Aspect 3 is the apparatus of any of aspects 1 and 2, further includes that a first portion and a second portion of the second codeword are transmitted frequency division duplexed or time division duplexed.

Aspect 4 is the apparatus of any of aspects 1-3, further includes that the at least one processor is further configured to rate match the generated first codeword before interleaving the first codeword, the interleaving the first codeword comprising interleaving the rate matched first codeword.

Aspect 5 is the apparatus of any of aspects 1-4, further includes that the at least one processor is further configured to rate match the generated second codeword before transmitting the second codeword, the transmitting comprising transmitting the rate matched second codeword.

Aspect 6 is the apparatus of any of aspects 1-5, further includes that the at least one processor is further configured to receive, from the second device, a configuration enabling the interleaving of the first codeword, wherein the interleaving is performed based on the received configuration.

Aspect 7 is the apparatus of any of aspects 1-6, further includes that the at least one processor is further configured to receive, from the second device, a configuration indicating at least one interleaver for interleaving the first codeword, wherein the interleaving is based on the received configuration.

Aspect 8 is the apparatus of any of aspects 1-7, further includes that the at least one processor is further configured to select one interleaver of the configured at least one interleaver, wherein the interleaving is based on the selected one interleaver; and transmit information to the second device indicating the selected one interleaver.

Aspect 9 is the apparatus of any of aspects 1-8, further includes that the at least one processor is further configured to transmit information to the second device indicating an interleaver used for interleaving the first codeword.

Aspect 10 is the apparatus of any of aspects 1-9, further includes that interleaving of the first codeword is performed based on an interleaver, the interleaver comprising one of a triangle interleaver, a pseudo-random interleaver, a feedback shift-register interleaver, a polynomial interleaver, or a look-up table based on interleaver.

Aspect 11 is the apparatus of any of aspects 1-10, further includes that the at least one processor is further configured to select an interleaver for interleaving the first codeword, the interleaver being selected based on one of a received configuration, or a channel condition of a channel for transmitting the second codeword.

Aspect 12 is the apparatus of any of aspects 1-11, further includes that the noncoherent error correction code comprises a noncoherent Reed Muller code.

Aspect 13 is a method of wireless communication for implementing any of aspects 1-12.

Aspect 14 is an apparatus for wireless communication including means for implementing any of aspects 1-12.

Aspect 15 is a computer-readable medium storing computer executable code, where the code when executed by a processor causes the processor to implement any of aspects 1-12.

Aspect 16 is for wireless communication at a second device including at least one processor coupled to a memory and configured to receive a first codeword from a first device; de-interleave the first codeword to permute coded bits of the first codeword into a second codeword; and decode the second codeword into a set of bits based on a noncoherent error correction code.

Aspect 17 is the apparatus of aspect 16, further including a transceiver coupled to the at least one processor.

Aspect 18 is the apparatus of any of aspects 16 and 17, further includes that a first portion and a second portion of the first codeword are transmitted frequency division duplexed or time division duplexed.

Aspect 19 is the apparatus of any of aspects 16-18, further includes that the at least one processor is further configured to transmit, to the first device, a configuration enabling an interleaving of the first codeword, wherein the de-interleaving is performed based on the transmitted configuration.

Aspect 20 is the apparatus of any of aspects 16-19, further includes that the at least one processor is further configured to transmit, to the first device, a configuration indicating at least one interleaver for interleaving the first codeword, wherein the de-interleaving is based on the transmitted configuration.

Aspect 21 is the apparatus of any of aspects 16-20, further includes that the at least one processor is further configured to receive information from the first device indicating a selected one interleaver of the at least one interleaver, wherein the de-interleaving is based on the selected one interleaver.

Aspect 22 is the apparatus of any of aspects 16-21, further includes that the at least one processor is further configured to receive information from the first device indicating an interleaver used for interleaving the first codeword, wherein the de-interleaving is based on the interleaver used to interleave the first codeword.

Aspect 23 is the apparatus of any of aspects 16-22, further includes that de-interleaving of the first codeword is performed based on an interleaver, the interleaver comprising one of a triangle interleaver, a pseudo-random interleaver, a feedback shift-register interleaver, a polynomial interleaver, or a look-up table based on interleaver.

Aspect 24 is the apparatus of any of aspects 16-23, further includes that the noncoherent error correction code comprises a noncoherent Reed Muller code.

Aspect 25 is a method of wireless communication for implementing any of aspects 16-24.

Aspect 26 is an apparatus for wireless communication including means for implementing any of aspects 16-24.

Aspect 27 is a computer-readable medium storing computer executable code, where the code when executed by a processor causes the processor to implement any of aspects 16-24.

What is claimed is:

1. An apparatus for wireless communication at a first wireless device, comprising:
    memory; and
    at least one processor coupled to the memory and configured to:

encode a set of bits based on a noncoherent error correction code to generate a first codeword;

receive, from a second device, a configuration indicating at least one interleaver;

interleave the first codeword to permute coded bits of the first codeword into a second codeword based on the at least one interleaver; and transmit, to the second device in a transmission, a first portion and a second portion of the second codeword that is frequency division duplexed or time division duplexed, wherein the transmission does not include a pilot or a demodulation reference signal (DM-RS).

2. The apparatus of claim 1, further comprising a transceiver coupled to the at least one processor.

3. The apparatus of claim 1, wherein the at least one processor is further configured to:

rate match the generated first codeword before interleaving the first codeword, the interleaving the first codeword comprising interleaving the rate matched first codeword.

4. The apparatus of claim 1, wherein the at least one processor is further configured to:

rate match the generated second codeword before transmitting the second codeword, the transmitting comprising transmitting the rate matched second codeword.

5. The apparatus of claim 1, wherein the at least one processor is further configured to:

receive, from the second device, a second configuration enabling the interleaving of the first codeword, wherein the interleaving is further based on the second configuration.

6. The apparatus of claim 1, wherein the at least one processor is further configured to:

select one interleaver of the configured at least one interleaver, wherein the interleaving is based on the selected one interleaver; and transmit information to the second device indicating the selected one interleaver.

7. The apparatus of claim 1, wherein the at least one processor is further configured to:

transmit information to the second device indicating an interleaver used for interleaving the first codeword.

8. The apparatus of claim 1, wherein the at least one interleaver comprises one of:

a triangle interleaver, a pseudo-random interleaver, a feedback shift-register interleaver, a polynomial interleaver, or a look-up table based on interleaver.

9. The apparatus of claim 1, wherein the at least one processor is further configured to:

select an interleaver from the at least one interleaver for interleaving the first codeword, the interleaver being selected based on a channel condition of a channel for transmitting the second codeword.

10. The apparatus of claim 1, wherein the noncoherent error correction code comprises a noncoherent Reed Muller code.

11. A method of wireless communication of a first device, comprising:

encoding a set of bits based on a noncoherent error correction code to generate a first codeword;

receiving, from a second device, a configuration indicating at least one interleaver;

interleaving the first codeword to permute coded bits of the first codeword into a second codeword based on the at least one interleaver; and transmitting, to the second device in a transmission, a first portion and a second portion of the second codeword that is frequency division duplexed or time division duplexed, wherein the transmission does not include a pilot or a demodulation reference signal (DM-RS).

12. The method of claim 11, further comprising:

rate matching the generated first codeword before interleaving the first codeword, the interleaving the first codeword comprising interleaving the rate matched first codeword.

13. The method of claim 11, further comprising:

rate matching the generated second codeword before transmitting the second codeword, the transmitting comprising transmitting the rate matched second codeword.

14. The method of claim 11, further comprising:

receiving, from the second device, a second configuration enabling the interleaving of the first codeword, wherein the interleaving is further based on the second configuration.

15. An apparatus for wireless communication at a second device, comprising:

memory; and at least one processor coupled to the memory and configured to:

receive, from a first device in a transmission, a first portion and a second portion of a first codeword that is frequency division duplexed or time division duplexed, wherein the transmission does not include a pilot or a demodulation reference signal (DM-RS);

de-interleave the first codeword to permute coded bits of the first codeword into a second codeword; and decode, without a channel estimation, the second codeword into a set of bits based on a noncoherent error correction code.

16. The apparatus of claim 15, further comprising a transceiver coupled to the at least one processor.

17. The apparatus of claim 15, wherein the at least one processor is further configured to:

transmit, to the first device, a configuration enabling an interleaving of the first codeword, wherein the de-interleaving is performed based on the transmitted configuration.

18. The apparatus of claim 15, wherein the at least one processor is further configured to:

transmit, to the first device, a configuration indicating at least one interleaver for interleaving the first codeword, wherein the de-interleaving is based on the transmitted configuration.

19. The apparatus of claim 18, wherein the at least one processor is further configured to:

receive information from the first device indicating a selected one interleaver of the at least one interleaver, wherein the de-interleaving is based on the selected one interleaver.

20. The apparatus of claim 15, wherein the at least one processor is further configured to:

receive information from the first device indicating an interleaver used for interleaving the first codeword, wherein the de-interleaving is based on the interleaver used to interleave the first codeword.

21. The apparatus of claim 15, wherein de-interleaving of the first codeword is performed based on an interleaver, the interleaver comprising one of:

a triangle interleaver, a pseudo-random interleaver, a feedback shift-register interleaver, a polynomial interleaver, or a look-up table based on interleaver.

22. The apparatus of claim 15, wherein the noncoherent error correction code comprises a noncoherent Reed Muller code.

23. A method of wireless communication of a second device, comprising:

receiving, from a first device in a transmission, a first portion and a second portion of a first codeword that is frequency division duplexed or time division duplexed, wherein the transmission does not include a pilot or a demodulation reference signal (DM-RS);

de-interleaving the first codeword to permute coded bits of the first codeword into a second codeword; and decoding, without a channel estimation, the second codeword into a set of bits based on a noncoherent error correction code.

24. The method of claim 23, further comprising:

transmitting, to the first device, a configuration enabling an interleaving of the first codeword, wherein the de-interleaving is performed based on the transmitted configuration.

25. The method of claim 23, further comprising:

transmitting, to the first device, a configuration indicating at least one interleaver for interleaving the first codeword, wherein the de-interleaving is based on the transmitted configuration.

26. The method of claim 23, further comprising:

receiving information from the first device indicating an interleaver used for interleaving the first codeword, wherein the de-interleaving is based on the interleaver used to interleave the first codeword.

\* \* \* \* \*